(12) United States Patent
Yamada et al.

(10) Patent No.: US 8,985,690 B2
(45) Date of Patent: Mar. 24, 2015

(54) SEAT RECLINING DEVICE AND SEAT DEVICE

(75) Inventors: Yukifumi Yamada, Toyota (JP); Naoki Goto, Tokai (JP)

(73) Assignee: Aisin Seiki Kabushiki Kaisha, Kariya-shi (JP)

( * ) Notice: Subject to any disclaimer, the term of this patent is extended or adjusted under 35 U.S.C. 154(b) by 70 days.

(21) Appl. No.: 13/820,841

(22) PCT Filed: Jan. 12, 2012

(86) PCT No.: PCT/JP2012/050530
§ 371 (c)(1), (2), (4) Date: Mar. 5, 2013

(87) PCT Pub. No.: WO2012/096357
PCT Pub. Date: Jul. 19, 2012

(65) Prior Publication Data
US 2013/0161995 A1    Jun. 27, 2013

(30) Foreign Application Priority Data

Jan. 14, 2011    (JP) ................................. 2011-006220
Jan. 14, 2011    (JP) ................................. 2011-006221

(51) Int. Cl.
*B60N 2/235*    (2006.01)
*A47C 1/025*    (2006.01)
*B60N 2/12*    (2006.01)

(52) U.S. Cl.
CPC ............. *B60N 2/2358* (2013.01); *A47C 1/025* (2013.01); *B60N 2/2356* (2013.01); *B60N 2/12* (2013.01)
USPC ...................................... 297/367 L; 297/341

(58) Field of Classification Search
USPC .................................................. 297/367, 341
See application file for complete search history.

(56) References Cited

U.S. PATENT DOCUMENTS 5,611,599 A    3/1997    Baloche et al.
5,882,074 A *    3/1999    Kojima ......................... 297/341

(Continued)

FOREIGN PATENT DOCUMENTS

JP    11 70027    3/1999
JP    11-208325 A    8/1999

(Continued)

OTHER PUBLICATIONS

International Search Report Issued Apr. 17, 2012 in PCT/JP12/50530 Filed Jan. 12, 2012.

(Continued)

*Primary Examiner* — Kristina Junge
(74) *Attorney, Agent, or Firm* — Oblon, McClelland, Maier & Neustadt, L.L.P.

(57) ABSTRACT

A memory mechanism is provided with engagement portions, a housing recess, a memory plate, and engagement receiving portions. The engagement portions are provided to an adjacent pair of pawls, respectively. The housing recess has a cylindrical shape and is provided to a first member. The memory plate is formed in an annular shape which is cut at one point. The memory plate is housed within the housing recess while being reduced in diameter with the cut portion disposed between the engagement portions. The engagement receiving portions are respectively adjacent between the engagement portions of the memory plate, to the engagement portions. The engagement portions are engaged with and disengaged from the engagement receiving portions as the pawls move in the radial direction.

11 Claims, 17 Drawing Sheets

(56) References Cited

U.S. PATENT DOCUMENTS

| | | | |
|---|---|---|---|
| 5,984,413 | A | 11/1999 | Baloche et al. |
| 6,007,153 | A | 12/1999 | Bennoit et al. |
| 6,095,608 | A | 8/2000 | Ganot et al. |
| 6,164,723 | A | 12/2000 | Ganot |
| 6,626,495 | B2 * | 9/2003 | Okazaki et al. ............ 297/367 R |
| 7,490,907 | B2 * | 2/2009 | Nagura et al. ............ 297/367 R |
| 7,614,700 | B2 | 11/2009 | Peters |
| 7,648,205 | B2 | 1/2010 | Zou et al. |
| 7,810,886 | B2 * | 10/2010 | Nagura et al. ................ 297/366 |
| 7,866,753 | B2 * | 1/2011 | Yamada et al. ............ 297/367 L |
| 2002/0096924 | A1 | 7/2002 | Reubeuze |
| 2004/0036338 | A1 | 2/2004 | Lardais et al. |
| 2011/0148164 | A1 | 6/2011 | Oori |
| 2013/0113260 | A1 * | 5/2013 | Kojima ..................... 297/361.1 |

FOREIGN PATENT DOCUMENTS

| | | |
|---|---|---|
| JP | 2002 248025 | 9/2002 |
| JP | 2008-44559 A | 2/2008 |
| JP | 2008-68721 A | 3/2008 |
| JP | 2008 273350 | 11/2008 |

OTHER PUBLICATIONS

Office Action issued Feb. 18, 2014 in Japanese Patent Application No. 2011-006220.

International Preliminary Report on Patentability and Written Opinion issued on Jul. 16, 2013 in Patent Application No. PCT/JP2012/050530.

* cited by examiner

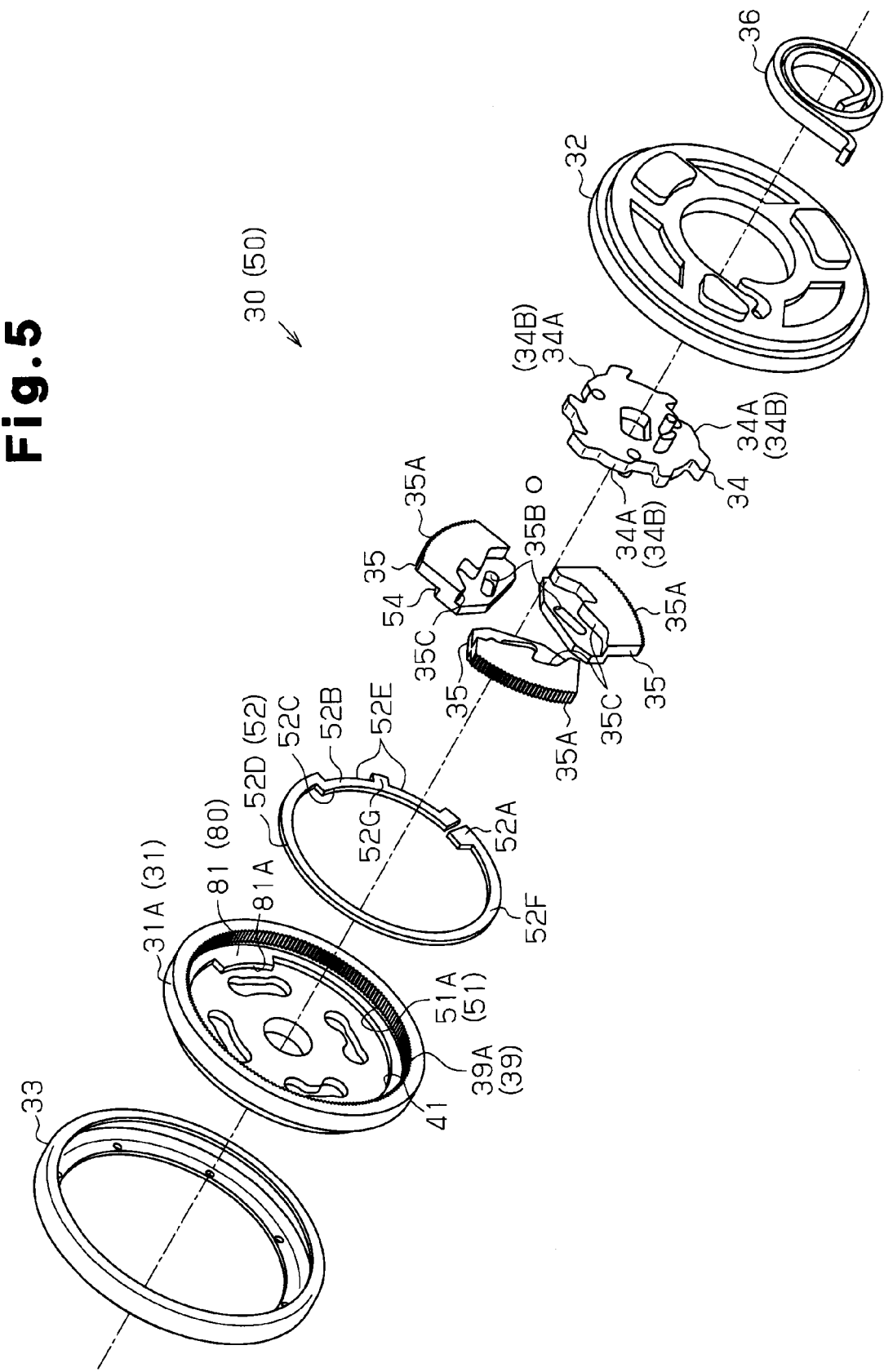

[Neutral position]

[ Neutral position ]

[ Neutral position ]

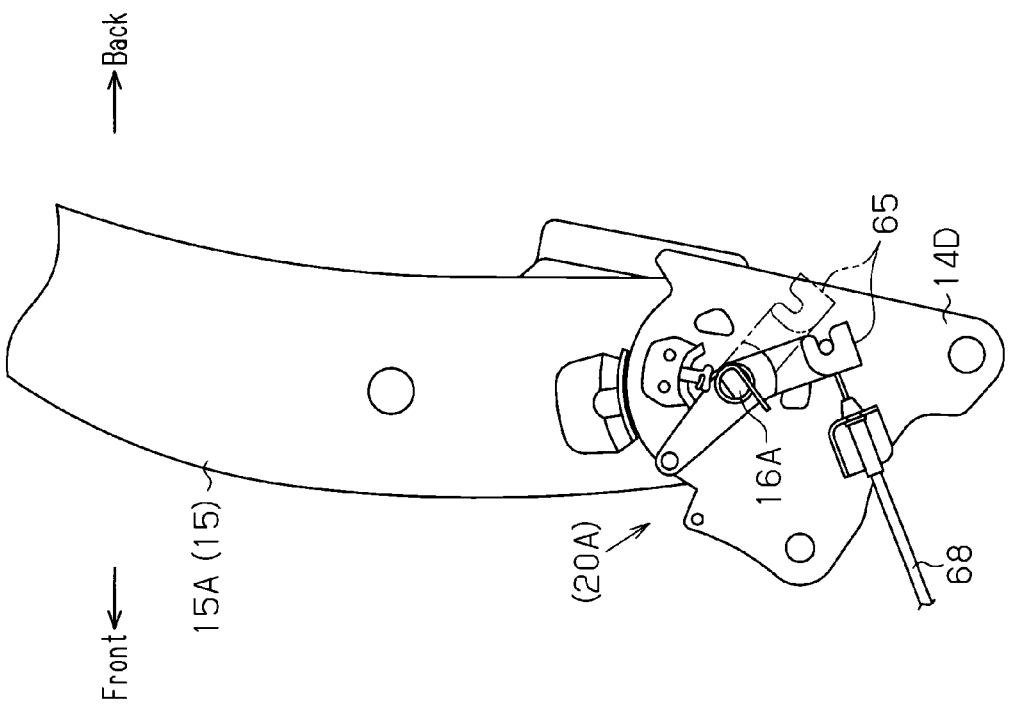
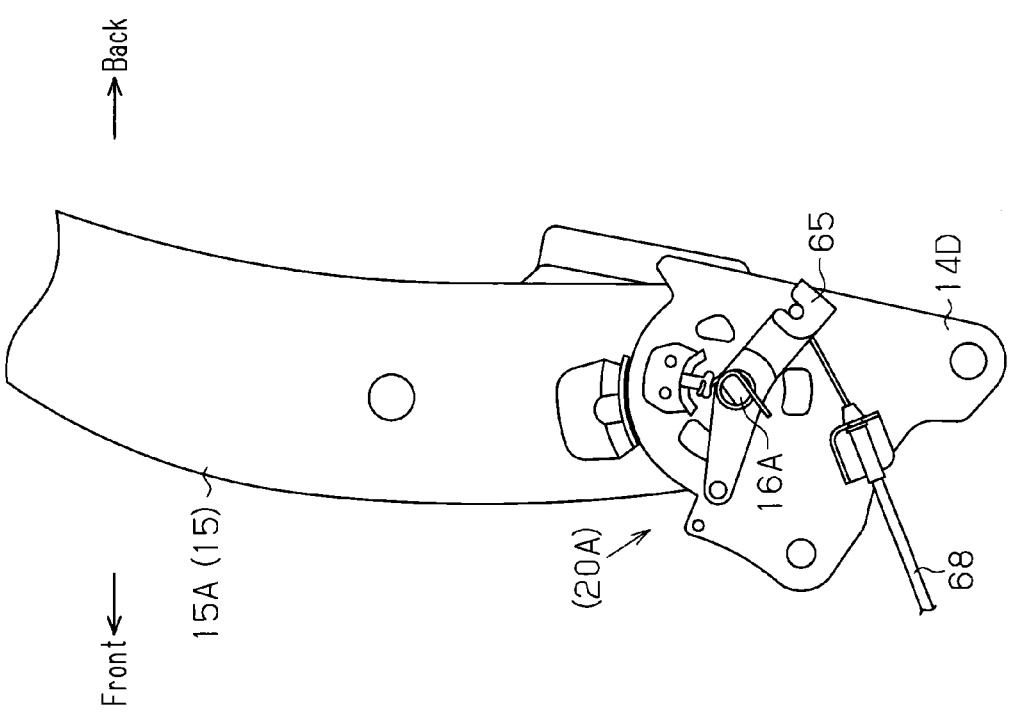

[ Neutral position ]

[ Neutral position ]

SEAT RECLINING DEVICE AND SEAT DEVICE

FIELD OF THE INVENTION

The present invention relates to a seat reclining device for adjusting the inclination angle of a seat back relative to a seat cushion, and to a seat device equipped with the seat reclining device.

BACKGROUND OF THE INVENTION

Seat reclining devices have locking mechanisms that allow for adjustment of the inclination angle of the seat back relative to the seat cushion. The seat back can be tilted forward to a predetermined position by means of the seat reclining device. By operating a first operation lever, the seat back can be switched between a locked state, in which the seat back is restricted from tilting relative to the seat cushion, and an unlocked state, in which the seat back is allowed to tilt. The seat back is urged to lean forward by forward tilt urging means. When unlocked, therefore, the seat back is tilted forward by the forward tilt urging means. The forward leaning seat back is then pulled back and returned to an upright position suitable for seating. Since, generally, the seat back is locked when it comes to the front limit of reclining, the passenger has to adjust the inclination angle of the seat back every time he or she sits on the seat. Manipulation of the seat back after it is tilted forward may therefore be not easy.

There has been proposed a seat reclining device that is capable of remembering an angular position of the seat back where it is located immediately before being tilted forward and setting the seat back to the angular position that has been remembered, when the forward tilted seat back is pulled back. With this, the seat back only needs to be pulled back up to be set again at the angular position where it is located before being tilted forward. Manipulation of the seat back is therefore easier when pulling back the seat back and seating. In many cases, however, the memory mechanism that remembers the angular position of the seat back is located at a different position from the locking mechanism, which causes an increase in the number of parts and cost.

Patent Document 1 discloses a seat reclining device equipped with a locking mechanism and a memory mechanism. The locking mechanism 100 is made up of a first member 101, a second member (not shown), a plurality of locking members 103, a cam 104, and a spring (not shown), as shown in FIG. 26(A). The first member 101 is attached to one of the seat cushion and the seat back, and has internal gear 106 around an operation shaft 105. The second member is attached to the other one of the seat cushion and the seat back, and rotates around the operation shaft 105 relative to the first member 101. The locking members 103 are attached to the second member and each have external teeth 107. The cam 104 is connected to the operation shaft 105 and urged counterclockwise in FIG. 26(A) by a spring. When the cam 104 rotates counterclockwise by the urging force, the locking members 103 are each pressed radially outward by the cam 104. The external teeth 107 thereby mesh with the internal gear 106, so that the seat back is locked. Operating a first operation lever rotates the cam 104 clockwise with the operation shaft 105. The locking members 103 are each moved radially inward by the cam 104. The external teeth 107 thereby disengage from the internal gear 106, so that the seat back is unlocked. There are two unlocked states of the seat: in one state, the seat back is allowed to tilt without an angular position being remembered by the memory mechanism 110, and in the other state, the seat back is allowed to tilt with an angular position being remembered by the memory mechanism 110.

The memory mechanism 110 includes a housing recess 111, engagement portions 112, and a memory plate 113. One engagement portion 112 each is provided on each locking member 103. The housing recess 111 is provided to the first member 101 and formed in a cylindrical shape. The engagement portions 112 each protrude from the locking members 103 along the operation shaft 105. The memory plate 113 is formed in an annular shape that is cut at one point. The memory plate 113 is housed in the housing recess 111 while being reduced in diameter. An engagement receiving portion 114, formed as a recess, is provided in the inner circumferential surface 113B of the memory plate 113. The engagement portions 112 engage with and disengage from the engagement receiving portion 114.

To tilt the locked seat back to a desired angle, the first operation lever is operated to rotate the operation shaft 105. In this case, the first operation lever is moved by an angle necessary for unlocking the seat back so that it can tilt, without its angular position being remembered by the memory mechanism 110. At this time, the cam 104 is rotated clockwise in FIG. 26(A) by a certain angle with the operation shaft 105. The rotation of the cam 104 slightly moves the locking members 103 radially inward, as shown in FIG. 26(B). As each locking member 103 moves, the external teeth 107 disengage from the internal gear 106. The seat back is thus unlocked. The engagement portion 112 is half engaged with the engagement receiving portion 114. When the seat back is tilted forward in this state, the locking members 103 each rotate with the memory plate 113 relative to the housing recess 111. At this time, the outer circumferential surface 113A of the memory plate 113 slides on the inner circumferential surface 111A of the housing recess 111. When the first operation lever is returned to its initial position, the cam 104 presses each of the locking members 103 radially outward by the urging force of the spring. The external teeth 107 thereby mesh with the internal gear 106, so that the seat back is locked.

To tilt the locked seat back forward, it is unlocked and allowed to tilt with its angular position being remembered by the memory mechanism 110. In this case, a second operation lever provided separately from the first operation lever is operated to rotate the operation shaft 105 more largely than when unlocking and allowing the seat back to tilt without an angular position being remembered by the memory mechanism 110. Thereby, the cam 104 rotates largely with the operation shaft 105 clockwise in FIG. 26(B). The rotation of the cam 104 moves each of the locking members 103 radially inward. Each locking member 103 moves more than when the first operation lever is operated. As each locking member 103 moves, the engagement portion 112 disengages from the engagement receiving portion 114. When the seat back is tilted forward in this state, the memory plate 113 remains retained by the housing recess 111 by the friction between the memory plate 113 and the housing recess 111, as shown in FIG. 26(C). The engagement portion 112 slides on the inner circumferential surface 113B of the memory plate 113 counterclockwise. Since the memory plate 113 does not rotate relative to the housing recess 111 at this time, the engagement receiving portion 114 stays in position relative to the first member 101. In this way, the angular position of the seat back where it is located immediately before being tilted forward is remembered by the memory plate 113.

The seat back that has been tilted forward is then pulled back against the urging force of the forward tilt urging means.

The engagement portion 112 then slides on the inner circumferential surface 113B of the memory plate 113 clockwise in FIG. 26(C), with the memory plate 113 retained by the housing recess 111. When the seat back comes to the angular position where it is located immediately before being tilted forward, the engagement portion 112 meets the engagement receiving portion 114, and each locking member 103 is pressed radially outward by the cam 104. The external teeth 107 thereby mesh with the internal gear 106, so that the seat back is locked. The angular position of the seat back where it is located immediately before being tilted forward can be remembered by such a simple structure, so that the seat back can be reset to the remembered angular position when it is pulled back up after being tilted forward.

However, in the seat reclining device described in Patent Document 1, when adjusting the locked seat back to a desired angular position, the engagement portion 112 is half engaged with the engagement receiving portion 114 as shown in FIG. 26(B). The locking members 103 rotate with the memory plate 113 relative to the housing recess 111 in this state. The memory plate 113 that has been reduced in diameter in the housing recess 111 is pressed against the inner circumferential surface 111A of the housing recess 111. Therefore, when the engagement portion 112 presses the engagement receiving portion 114 to enlarge the cut portion of the memory plate 113, the friction between the outer circumferential surface 113A of the memory plate 113 and the inner circumferential surface 111A of the housing recess 111 is increased. The sliding resistance of the memory plate 113 becomes accordingly large, which makes it harder to rotate the memory plate 113 relative to the housing recess 111. This consequently increases the operation load when adjusting the angular position of the seat back.

It is conceivable to reduce the surface pressure between the outer circumferential surface 113A of the memory plate 113 and the inner circumferential surface 111A of the housing recess 111 to reduce the sliding resistance of the memory plate 113. With this approach, however, if adopted, the memory plate 113 could no longer be retained by the housing recess 111 in an unlocked state where the seat back is allowed to tilt with an angular position of the seat back being remembered. The memory plate 113 would therefore rotate with the locking members 103 and could not fully exhibit its memory function.

PRIOR ART DOCUMENT

Patent Document

Patent Document 1: Japanese Laid-Open Patent Publication No. 11-70027

SUMMARY OF THE INVENTION

An objective of the present invention is to provide a seat reclining device and a seat device in which a memory plate is made irrotational in an unlocked state where the seat back is allowed to tilt with an angular position being remembered, and in which operation load is reduced in an unlocked state where the seat back is allowed to tilt without an angular position being remembered.

To achieve the foregoing objective and in accordance with a first aspect of the present invention, a seat reclining device including a locking mechanism and a memory mechanism is provided. The locking mechanism switches a seat back between a locked state, in which the seat back is restricted from tilting relative to a seat cushion, and an unlocked state, in which the seat back is allowed to tilt, in accordance with a rotating movement of an operation shaft. The memory mechanism stores an angular position of the seat back where it is located immediately before being unlocked. The seat back, once unlocked, is locked only when it is tilted to the angular position that has been remembered. The locking mechanism includes a first member, a second member, and a plurality of locking members. The first member is attached to one of the seat cushion and the seat back and has an internal gear around the operation shaft. The second member is attached to the other one of the seat cushion and the seat back and rotational around the operation shaft relative to the first member. The locking members are each attached to the second member and have external teeth facing the internal gear. The seat back is locked when the locking members are each pressed radially outward so that the external teeth mesh with the internal gear. The seat back is unlocked when the operation shaft is rotated thereby to move each of the locking members radially inward so that the external teeth disengage from the internal gear. The memory mechanism includes an engagement portion, a housing recess, a memory plate, and a pair of engagement receiving portions. The engagement portion is provided to adjacent pair of locking members. The housing recess is formed in a cylindrical shape in the first member. The memory plate is formed in an annular shape that is cut at one point. The memory plate is housed in the housing recess while being reduced in diameter with the cut portion being located between the engagement portions. Each of the pair of engagement receiving portions is provided to the memory plate and adjacent to and between the engagement portions. The engagement portions engage with and disengage from the engagement receiving portions as the locking members move in the radial direction. The unlocked state includes: an unlocked state in which the engagement receiving portions are pressed circumferentially with the engagement portions half engaged with the engagement receiving portions and the memory plate rotates together with the locking members relative to the housing recess, so that the seat back is allowed to tilt without the angular position being remembered; and an unlocked state in which the engagement portion rides over the engagement receiving portion and slides on an inner circumferential surface of the engagement receiving portion with the memory plate being made irrotational relative to the housing recess, so that the seat back is allowed to tilt with the angular position being stored.

With the above configuration, the locking members attached to the second member are each pressed radially outward. With the external teeth of the locking members meshing with the internal gear of the first member, the seat back is locked. Thereby, the seat back is restricted from tilting relative to the seat cushion. To unlock the seat back, the operation shaft is rotated, to move each of the locking members radially inward. This disengages the external teeth from the internal gear so that the first member and the second member can rotate relative to each other. Thus the seat back is allowed to tilt relative to the seat cushion. There is one unlocked state, in which the seat back is allowed to tilt without an angular position being remembered, and another unlocked state where the seat back is allowed to tilt with an angular position being remembered.

In the former unlocked state, the engagement portions of the locking members half engage with the adjacent engagement receiving portions. Since the engagement receiving portions are pressed by the engagement portions in this state, the memory plate rotates with the locking members relative to the housing recess. The cut portion of the memory plate is positioned between the engagement portions of the respective locking members. The pair of engagement receiving portions of the memory plate are located between the engagement portions and adjacent to the respective engagement portions. Namely, the engagement receiving portions are each located between the cut portion and the engagement portion. Therefore, when one of the engagement portions presses the adjacent engagement receiving portion, the other engagement portion does not press the adjacent engagement receiving portion. The one engagement portion presses the engagement receiving portion circumferentially in a direction in which the space of the cut portion of the memory plate is reduced. Contrarily, when the other engagement portion presses the adjacent engagement receiving portion, the one engagement portion does not press the adjacent engagement receiving portion. The other engagement portion presses the engagement receiving portion circumferentially in a direction in which the space of the cut portion of the memory plate is reduced. As the space of the cut portion is reduced, the memory plate is reduced in diameter when the seat back is tilted. Therefore, since the friction between the outer circumferential surface of the memory plate and the inner circumferential surface of the housing recess is reduced, the seat back can be adjusted to a desired inclination angle with an appropriate operation load.

In the latter unlocked state, one of the engagement portions rides over the corresponding engagement receiving portion. With the memory plate being made irrotational relative to the housing recess, one of the engagement portions slides on the inner circumferential surface of the engagement receiving portion. In this case, unlike the former unlocked stated, the one engagement receiving portion is not pressed circumferentially by the corresponding engagement portion, so that the memory plate is not reduced in diameter. The memory plate is housed in the housing recess while being reduced in diameter. Since the memory plate is in pressure contact with the inner circumferential surface of the housing recess, there is large friction between the outer circumferential surface of the memory plate and the inner circumferential surface of the housing recess. Accordingly, the memory plate is made irrotational relative to the housing recess and can exhibit its intended memory function.

In the above described seat reclining device, the housing recess is preferably adjacent to a meshing part of the internal gear and the external teeth on an opposite side from the second member, and the housing recess preferably supports an outer circumferential surface of the memory plate with an inner circumferential surface having the same diameter as the diameter of the addendum circle of the internal gear or with tooth tops of the internal gear.

With the above configuration, the housing recess is adjacent to the meshed portion between the internal gear and the external teeth on the opposite side from the second member. The memory plate is housed in the housing recess to be slidable in the circumferential direction. The locking members having external teeth facing the internal gear are arranged between the memory plate and the second member. As the locking members are each moved radially, their external teeth are made to mesh with or disengage from the internal gear. To allow easy movement of the locking members, there are gaps around each locking member. The memory plate in the housing recess can easily come off of the housing recess by its restoring force and move into the gap, which may adversely affect the operation of the locking mechanism or the memory mechanism. In this respect, according to the present invention, the housing recess supports the outer circumferential surface of the memory plate with the inner circumferential surface having the same diameter as the diameter of the addendum circle of the internal gear, or with the tooth tops of the internal gear. Therefore, the gap around each locking member can be minimized as much as possible. Accordingly, even if the memory plate comes off of the housing recess by its own restoring force, it can hardly go into such a gap.

In the above described seat reclining device, the engagement receiving portions preferably protrude radially inward from different positions on the memory plate. The memory plate preferably has a radial thickness set identical in a portion between the engagement receiving portions and in the engagement receiving portion of the memory plate, and the engagement receiving portion is preferably a portion on which the engagement portion slides in a state in which the seat back is unlocked and allowed to tilt with the angular position being remembered.

The portion on which the engagement portion slides when unlocking the seat back so that it can be tilted with an angular position being remembered, is an inner circumferential surface of the engagement receiving portion. The engagement receiving portion is positioned inner than the portion between the engagement receiving portions of the memory plate. If the outer diameter of the memory plate were the same all around, the thickness would be larger in the engagement receiving portion than in other portions. The memory plate may then be distorted when it is flexed and assembled into the housing recess, and may resist being fitted into the housing recess. In this respect, according to the present invention, the thickness of the memory plate is set the same in the engagement receiving portion and in other portions. Therefore, the memory plate will not be distorted when it is flexed and assembled into the housing recess, and can easily be fitted into the housing recess. The memory plate will not be distorted, either, when the memory plate rotates with the locking members by the pressure applied circumferentially from the engagement portion to the engagement receiving portion, but will be reduced in diameter, with its uniform annular shape maintained. Thereby, the friction applied between the outer circumferential surface of the memory plate and the inner circumferential surface of the housing recess can be made uniform.

In the above described seat reclining device, it is preferable that: the seat reclining device be applied to a seat device having a first operation lever, a second operation lever, and a seat sliding device; the first operation lever be operated to rotate the operation shaft to unlock and allow the seat back to tilt without the angular position being remembered; the second operation lever be operated to rotate the operation shaft to unlock and allow the seat back to tilt without the angular position being remembered, and to rotate the operation shaft more largely than for the unlocking, thereby to unlock and allow the seat back to tilt with the angular position being remembered; the seat back have a tilting range divided into a seating region, in which the inclination angle thereof is adjusted, and a forward folding region set forward of the seating region; the seat back be tilted relative to the seat cushion within the tilting range around the operation shaft, which is rotated by operating the first operation lever or the second operation lever; and the seat sliding device restrict sliding movement of the seat cushion at least in the seating region, and cancels the restriction of the sliding movement of the seat cushion in coordination with a tilting movement of the seat back from the seating region into the forward folding region after being unlocked by the locking mechanism upon the second operation lever being operated. The seat reclining device preferably further includes. During operation of the first operation lever, the switch limit mechanism preferably allows switching between locking and unlocking of the seat back by the locking mechanism only when the seat back is tilted within the seating region.

The seat sliding device restricts the sliding movement of the seat cushion at least when the seat back is tilted in the seating region. When the second operation lever is operated to unlock the locking mechanism, after which the seat back is tilted forward from the seating region into the forward folding region, the seat sliding device cancels the restriction of the sliding movement, in coordination with the forward tilting of the seat back. Thereby the seat cushion is allowed to slide.

With a common seat reclining device, the seat back can be locked or unlocked by the locking mechanism when the first operation lever is operated, wherever angular position in the tilting range the seat back is located. In this case, there is a possibility that, in adjusting the inclination angle of the seat back by operating the first operation lever, the seat back may be accidentally tilted in the forward folding region, whereupon the restriction of the sliding movement may be canceled. In this respect, according to the present invention, the switch limit mechanism limits the locking mechanism to lock or unlock the seat back when the first operation lever is operated, only when the seat back is tilted within the seating region. Therefore, even with the first operation lever being operated, the switching between the locked and unlocked states is disabled in the forward folding region. As a result, when adjusting the inclination angle of the seat back by operating the first operation lever, the seat back will not be accidentally tilted in the forward folding region. The seat sliding device, therefore, will not cancel the restriction of the sliding movement.

In the above described seat reclining device. The switch limit mechanism preferably includes a rotation restricting portion provided in the first member, and the rotation restricting portion preferably has an inner circumferential surface with the same diameter as that of the inner circumferential surface of the engagement receiving portion, on which the engagement portion slides. When the first operation lever is operated, the engagement portion that is half engaged is preferably abutted on the rotation restricting portion so that the memory plate and the locking members are restricted from rotating, whereby the seat back is stopped from tilting from the seating region into the forward folding region. When the second operation lever is operated, the engagement portion preferably rides over the engagement receiving portion and the rotation restricting portion and slides on the inner circumferential surface of the engagement receiving portion, whereby the seat back tilts from the seating region into the forward folding region.

With the above configuration, when the first operation lever is operated to tilt the seat back from the seating region into the forward folding region, the engagement portion that is half engaged with the engagement receiving portion abuts on the rotation restricting portion. This restricts the memory plate and the locking members from rotating, whereby the first member is restricted from rotating relative to the second member. The seat back is thus stopped from being tilted into the forward folding region. On the other hand, when the second operation lever is operated to tilt the seat back from the seating region into the forward folding region, the engagement portion rides over the engagement receiving portion and the rotation restricting portion, and slides on the inner circumferential surface of the engagement receiving portion. The locking members are thereby allowed to rotate, so that the second member is allowed to rotate relative to the first member, whereby the seat back is allowed to tilt from the seating region into the forward folding region.

To achieve the foregoing objective and in accordance with a second aspect of the present invention, a seat device having the above described seat reclining device is provided. The seat reclining device is provided on either side of the seat device, and the operation shafts of the respective seat reclining devices are integrally rotational.

With the above configuration, the seat reclining devices provided on both sides of the seat device have the same locking mechanism and memory mechanism. The operation shafts, which make the locking mechanisms and memory mechanisms of the respective seat reclining devices work, are connected to be integrally rotational. Therefore, the locking mechanisms of both seat reclining devices work in synchronism, and so do the memory mechanisms, when the operation shafts are rotated.

In the above described seat device, the first operation lever or the second operation lever is preferably operated to rotate the operation shafts to unlock and allow the seat back to tilt without the angular position being remembered, and the second operation lever is preferably operated to rotate the operation shafts more largely than when unlocking and allowing the seat back to tilt without the angular position being remembered, whereby the seat back is unlocked and allowed to tilt with the angular position being remembered. The seat device further includes. When the second operation lever is operated to unlock and allow the seat back to tilt with the angular position being stored, the lost motion mechanism preferably puts the first operation lever in a non-operational state without transmitting a movement of the second operation lever to the first operation lever.

The rotation amount of the operation shafts rotated by operating the second operation lever when unlocking and allowing the seat back to tilt with an angular position being remembered is greater than the rotation amount of the operation shafts rotated by the first operation lever or the second operation lever when unlocking and allowing the seat back to tilt without an angular position being remembered. In this respect, according to the present invention, when the second operation lever is operated as in the former case, the lost motion mechanism does not transmit the movement of the second operation lever to the first operation lever and puts the first operation lever in a non-operational state. Thereby, the difference in the amount of rotation of the operation shafts between the former unlocked state and the latter unlocked state can be absorbed.

In the above described seat device, the first operation lever is preferably supported to be rotational relative to the operation shafts, and the second operation lever is connected to the operation shafts. The lost motion mechanism preferably includes: a link member connected to the operation shafts; an oblong hole that is provided to one of the first operation lever and the link member and has an arcuate shape having a center coinciding with the operation shaft; and a pin that is provided to the other one of the first operation lever and the link member and is received in the oblong hole. When the second operation lever is operated to unlock and allow the seat back to tilt with the angular position being remembered, the pin is preferably allowed to move within the oblong hole so that the movement of the second operation lever is not transmitted to the first operation lever and the first operation lever is put in a non-operational state.

With the above configuration, when the second operation lever is operated to unlock and allow the seat back to tilt with the angular position being remembered, the pin is allowed to move within the oblong hole so that the movement of the second operation lever is not transmitted to the first operation lever and the first operation lever is put in a non-operational state.

To achieve the foregoing objective and in accordance with a third aspect of the present invention, a vehicle seat device is provided that includes a seat back, a locking mechanism, a seat sliding device, and a switch limit mechanism. The seat back has a tilting range divided into a seating region, in which an inclination angle thereof is adjusted, and a forward folding region set forward of the seating region. The seat back is tilted within the tilting range around an operation shaft relative to the seat cushion. When a first operation lever or a second operation lever is operated to rotate the operation shaft, the locking mechanism switches the seat back between a locked state, in which the seat back is restricted from tilting relative to the seat cushion, and an unlocked state, in which the seat back is allowed to tilt. The seat cushion is restricted from sliding at least in the seating region. The restriction of the sliding movement of the seat cushion is canceled in coordination with a tilting movement of the seat back from the seating region into the forward folding region after being unlocked by the locking mechanism, upon the second operation lever being operated. During operation of the first operation lever, the switch limit mechanism allows switching between locking and unlocking of the seat back by the locking mechanism only when the seat back is tilted within the seating region.

In the above described vehicle seat, the locking mechanism preferably includes a first member, a second member, and a plurality of locking members, the first member is preferably attached to one of the seat cushion and the seat back and has an internal gear around the operation shaft, and the second member is preferably attached to the other one of the seat cushion and the seat back and rotational around the operation shaft relative to the first member. Further, the locking members are preferably each attached to the second member and have external teeth facing the internal gear. The seat back is preferably locked when the locking members are each pressed radially outward so that the external teeth mesh with the internal gear, and the seat back is preferably unlocked when the operation shaft is rotated thereby to move each of the locking members radially inward so that the external teeth disengage from the internal gear.

The above described vehicle seat device preferably includes a memory mechanism that remembers an angular position of the seat back where it is located immediately before being unlocked. The seat back, once unlocked, is preferably locked only when it is tilted to the angular position that has been remembered, and the memory mechanism preferably works when the second operation lever is operated to rotate the operation shaft.

With the above configuration, switching between the locked and unlocked states by the locking mechanism is performed as well as the memory mechanism is made to work when the operation shaft is rotated by operating the second operation lever. In the latter case, the angular position of the seat back where it is located immediately before being unlocked is remembered, and the unlocked seat back is locked by the locking mechanism only when it is tilted to the remembered angular position.

In the above described vehicle seat device, it is preferable that: the memory mechanism include a housing recess, a memory plate, and an engagement portion; the housing recess be formed in a cylindrical shape in the first member; the memory plate be formed in an annular shape that is cut at one point; the memory plate be housed in the housing recess while being reduced in diameter; the memory plate include a pair of engagement receiving portions at different positions; and the engagement portion be provided to each of a pair of locking members, and engages with and disengages from the engagement receiving portions as the locking members move in the radial direction. The unlocked state preferably include: an unlocked state in which the engagement receiving portions are pressed circumferentially with the engagement portions half engaged with the engagement receiving portions and the memory plate rotates together with the locking members relative to the housing recess, so that the seat back is allowed to tilt without the angular position being remembered; and an unlocked state in which the engagement portion going over the engagement receiving portion and slides on an inner circumferential surface of the memory plate with the memory plate being made irrotational relative to the housing recess, so that the seat back is allowed to tilt with the angular position being stored.

In the above described vehicle seat device, the switch limit mechanism preferably includes a rotation restricting portion provided in the first member, and the rotation restricting portion preferably has an inner circumferential surface with the same diameter as that of the inner circumferential surface of the memory plate on which the engagement portion slides. When the first operation lever is operated, the engagement portion that is half engaged is preferably abutted on the rotation restricting portion so that the memory plate and the locking members are restricted from rotating, whereby the seat back is stopped from tilting from the seating region into the forward folding region. When the second operation lever is operated, the engagement portion preferably rides over the engagement receiving portion and the rotation restricting portion and slides on the inner circumferential surface of the memory plate, whereby the seat back is allowed to tilt from the seating region into the forward folding region.

In the above described the vehicle seat device, the switch limit mechanism preferably includes: an abutment receiving portion that is provided to the seat back and is displaced with a tilting movement of the seat back; a movable stopper tiltably supported by a shaft to tilt between an abutting position, where the movable stopper is abutted on the abutment receiving portion to restrict tilting of the seat back, and a non-abutting position, where the movable stopper is retracted from the abutting position; a link member that is connected to the operation shaft and capable of transmitting, to the movable stopper, rotation of the operation shaft upon the first operation lever or the second operation lever being operated; and rotation transmission control means. The rotation transmission control means: does not transmit rotating movement of the link member to the movable stopper when the first operation lever or the second operation lever is operated in order to rotate the operation shaft by an angle for unlocking and allowing the seat back to tilt without an angular position being remembered; positions the movable stopper at the abutting position to restrict the seat back from being tilted forward, whereby switching between the locked and unlocked states by the locking mechanism is allowed to be performed only when the seat back is tilted within the seating region; transmits rotating movement of the link member to the movable stopper when the second operation lever is operated more largely to rotate the operation shaft than when unlocking and allowing the seat back to tilt without an angular position being remembered; and retracts the movable stopper to the non-abutting position to cancel the restriction of the forward tilting of the seat back, whereby the seat back is allowed to tilt from the seating region into the forward folding region.

With the above configuration, the operation shaft can be rotated by an angle necessary for unlocking and allowing the seat back to tilt without an angular position being remembered, by operating the first operation lever or the second operation lever. At this time, the rotation transmission control means can stop the rotating movement of the link member from being transmitted to the movable stopper. Thereby, with the movable stopper being located at the abutting position and abutting on the abutment receiving portion, the seat back is restricted from tilting forward. Accordingly, the switching between the locked and unlocked states by the locking mechanism can be limited to be performed only when the seat back is tilted within the seating region. The operation shaft can be rotated more largely than when unlocking and allowing the seat back to tilt without an angular position being remembered, by operating the second operation lever. At this time, the rotating movement of the link member is transmitted to the movable stopper, and the movable stopper retracts to the non-abutting position. This cancels the restriction of the forward tilting of the seat back, so that the seat back can be tilted forward from the seating region into the forward folding region.

In the above described vehicle seat device the rotation transmission control means preferably includes a cam hole formed in one of the movable stopper and the link member, and a pin provided to the other one of the movable stopper and the link member and received in the cam hole.

In this case, when the first operation lever is operated, the link member rotates with the operation shaft, and the position of the pin inside the cam hole is changed around the operation shaft. The rotating movement of the link member at this time is not transmitted to the movable stopper via the pin and the cam hole. Thereby, with the movable stopper being located at the abutting position and abutting on the abutment receiving portion, the seat back is restricted from tilting forward. The operation shaft can be rotated more largely than when unlocking and allowing the seat back to tilt without an angular position being remembered, by operating the second operation lever. At this time, the link member rotates with the operation shaft more largely than when the first operation lever is operated. Therefore, the rotating movement of the link member is transmitted to the movable stopper via the pin and the cam hole.

BRIEF DESCRIPTION OF THE DRAWINGS

FIG. 5 is an exploded perspective view of the seat reclining device;

FIG. 16 is a partial side view illustrating the vicinity of an operation shaft on the left side of the vehicle seat device;

FIG. 17 is a partial side view of the same when the second operation lever is pulled up;

DETAILED DESCRIPTION OF THE PREFERRED EMBODIMENTS (First Embodiment)

Hereinafter, a first embodiment the present invention in which the invention is embodied as a vehicle seat device equipped with a walk-in system will be described with reference to FIGS. 1 to 22. In the following description, the forward moving direction of the vehicle will be referred to as front or forward, the backward moving direction of the vehicle as rear or backward, the height direction of the vehicle as up and down direction, and the vehicle width direction when the vehicle is moving forward as left-right direction. The vehicle here is a two-door one-box car with a relatively small space for getting in and out.

Figure 1:
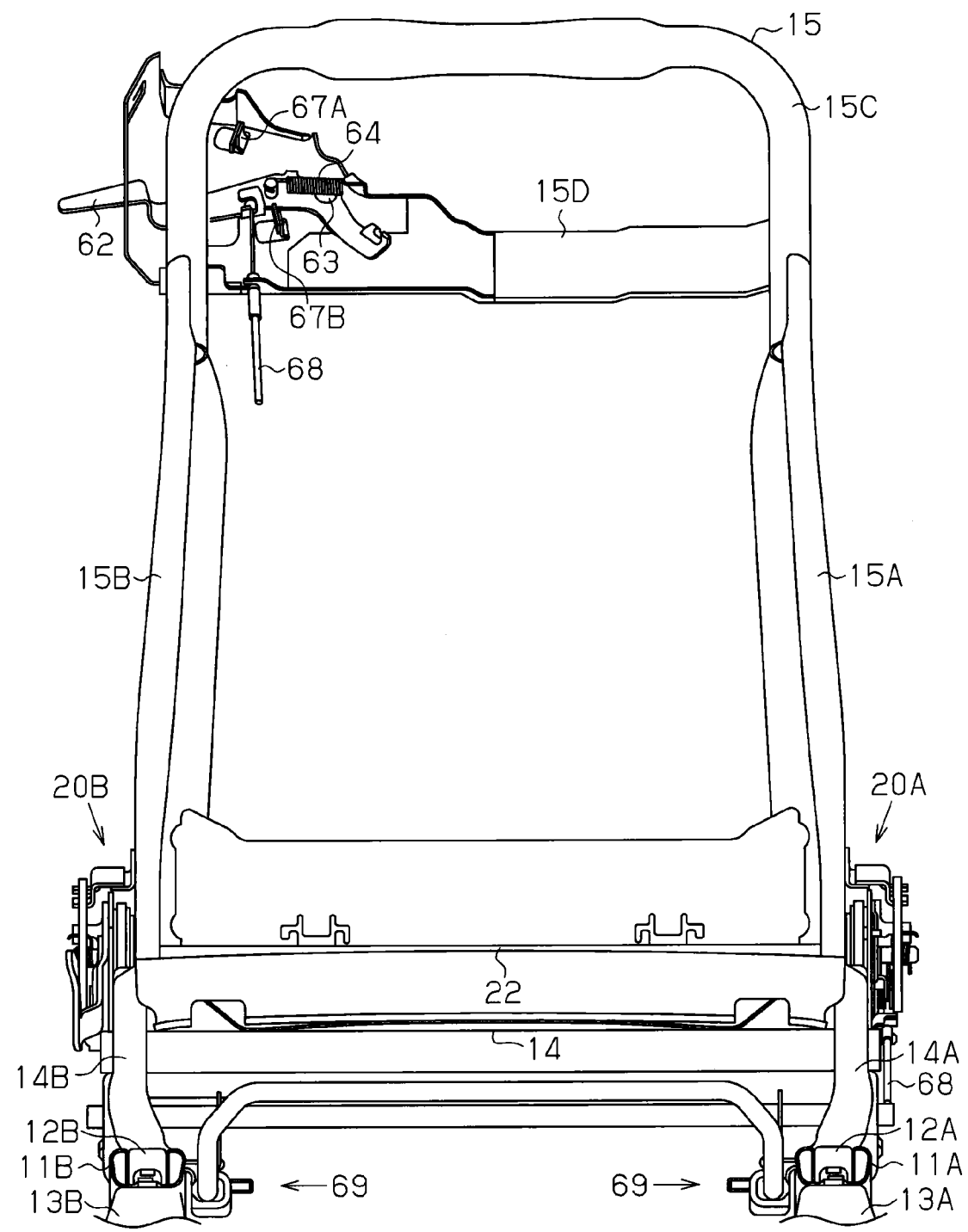
FIG. 1 is a front view illustrating the framework of a vehicle seat device according to a first embodiment of the present invention.
Figure 2:
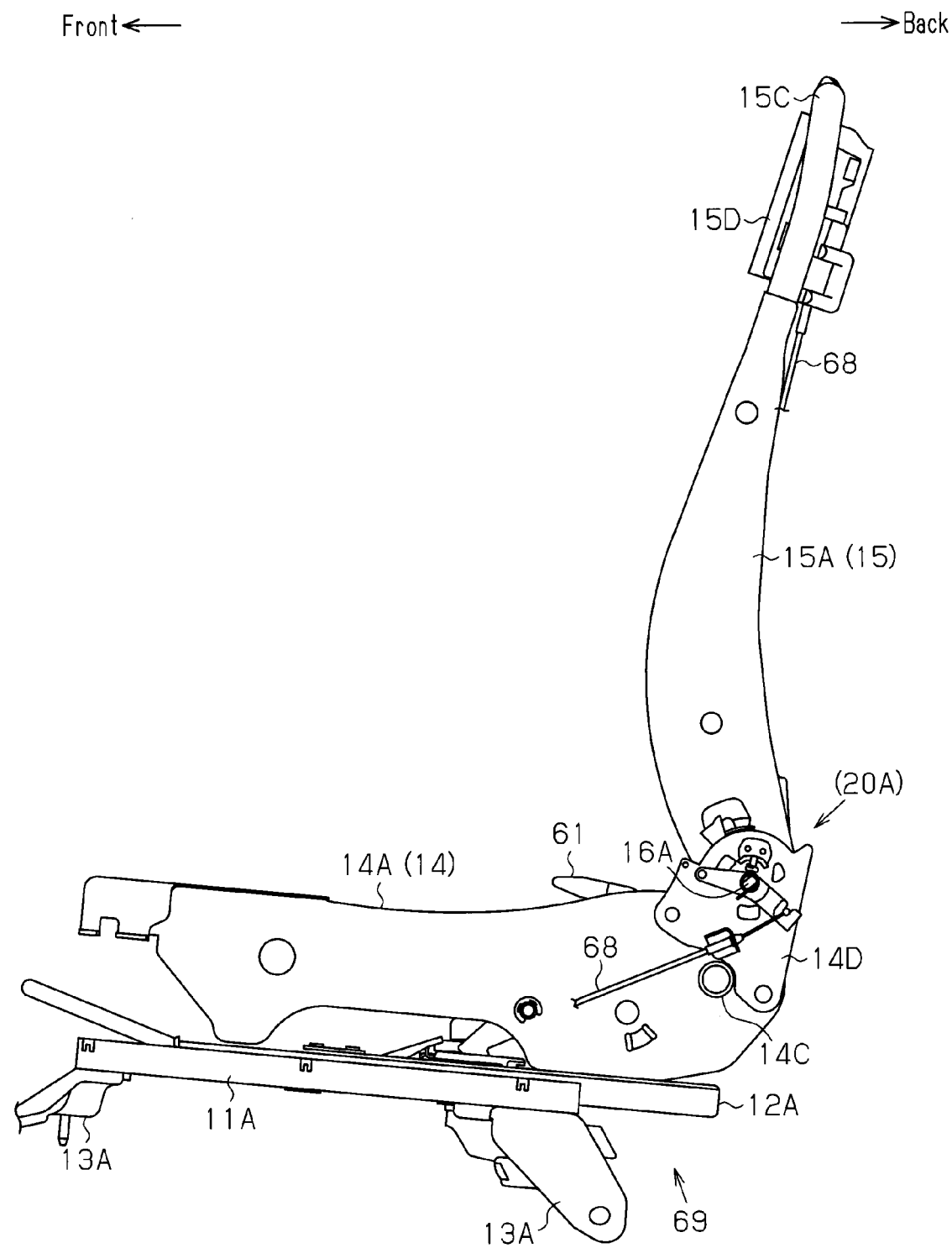
FIG. 2 is a side view illustrating the framework of the vehicle seat device.

As shown in FIGS. 1 and 2, the vehicle seat device includes a pair of lower rails 11A and 11B, a pair of upper rails 12A and 12B, a seat cushion frame 14, and a seat back frame 15. The lower rails 11A and 11B have their longitudinal direction oriented in the front to back direction, and are secured to the vehicle floor (not shown) with brackets 13A and 13B. The upper rails 12A and 12B are attached to be slidable back and forward relative to the lower rails 11A and 11B.

The seat cushion frame 14 forms the framework of a seat cushion, on which a passenger sits. The seat cushion frame 14 includes a pair of lower arms 14A and 14B, a coupling rod 14C connecting the rear ends of both lower arms 14A and 14B, and a pair of support brackets 14D and 14E (see FIGS. 14 and 15) fixedly attached to the rear ends of the respective lower arms 14A and 14B. The lower arms 14A and 14B are respectively supported by the upper rails 12A and 12B.

The seat back frame 15 is rotationally coupled to the rear ends of the lower arms 14A and 14B. The seat back frame 15 forms the framework of the seat back that supports the upper body of the passenger from behind. The seat back frame 15 includes a pair of side frames 15A and 15B, an upper pipe 15C connecting the upper ends of both side frames 15A and 15B, and a cross member 15D arranged between the ends of the upper pipe 15C.

Figure 3:
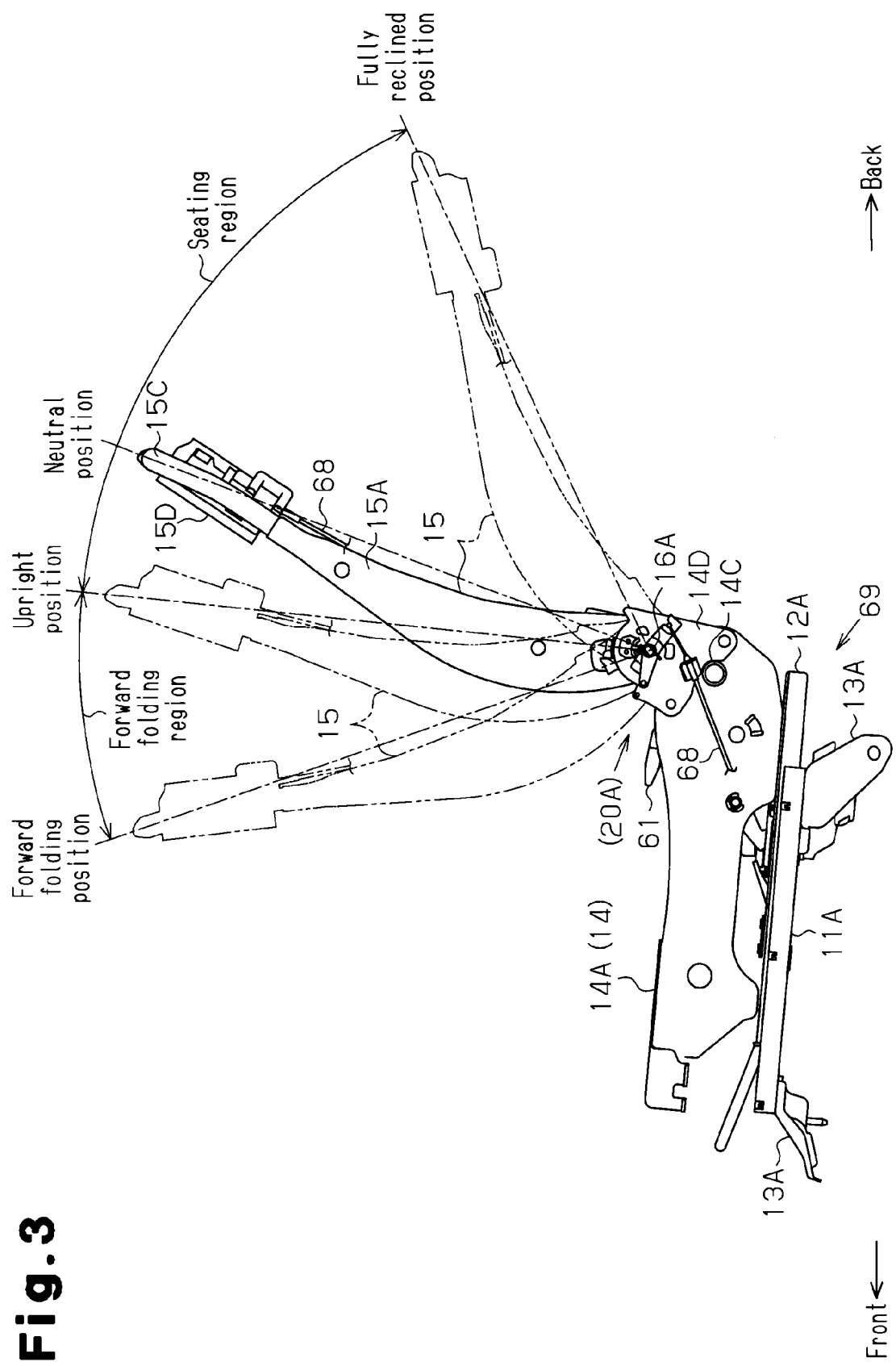
FIG. 3 is a side view illustrating the tilting range of the seat back.

The tilting range of the seat back frame 15 is divided into a seating region and a forward folding region, as shown in FIG. 3. The seat back frame 15 is tiltable to the seat cushion frame 14 around operation shafts 16A and 16B. With the upright position, where the seat back is upright, being the reference point, the seating region is from this upright position to a fully reclined position, where the seat back is tilted far backward. The angular position of the seat back frame 15 indicated by solid lines in FIG. 3 represents the angular position of the seat back when a passenger is seated (hereinafter referred to as a neutral position). The forward folding region is from the upright position to a forward folding position, where the seat back is tilted forward.

A walk-in system is used when seating on a second-row seat through a door of a two-door car, or when seating on a third-row seat through a rear door of a one-box car. More specifically, the walk-in system works to tilt the seat back forward as well as to slide the seat cushion forward in order to achieve more space for access to the seat.

The vehicle seat device is equipped with a pair of seat reclining devices 20A and 20B having the same configuration. The seat reclining devices 20A and 20B adjust and maintain the inclination angle of the seat back relative to the seat cushion. The seat reclining device 20A is arranged between the support bracket 14D and the side frame 15A. The seat reclining device 20B is arranged between the support bracket 14E and the side frame 15B. The seat reclining devices 20A and 20B each have a spiral spring (not shown), and a locking mechanism 30 and a memory mechanism 50 shown in FIG. 4.

The spiral springs urges the seat back forward. The spiral springs are made of a wire member formed in a spiral shape. One end of the spiral springs is retained by the seat cushion frame 14, while the other end is retained by the seat back frame 15. The locking mechanism 30 switches the seat back between a locked state, in which the seat back is restricted from tilting relative to the seat cushion, and an unlocked state, in which the seat back is allowed to tilt. The operation shaft 16A of the left-side seat reclining device 20A and the operation shaft 16B of the right-side seat reclining device 20B are coupled to each other by a common rod 22, as shown in FIG. 1.

Figure 7:
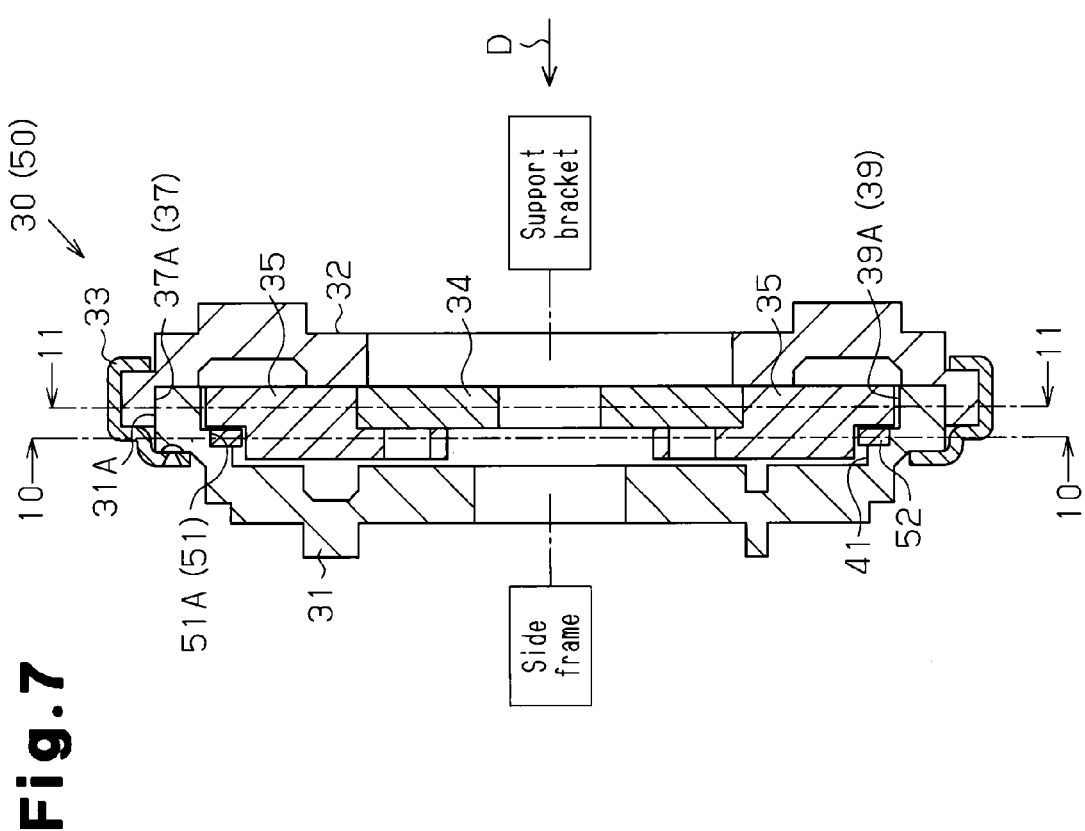
FIG. 7 is a cross-sectional view taken along line 7-7 of FIG. 6.
Figure 6:
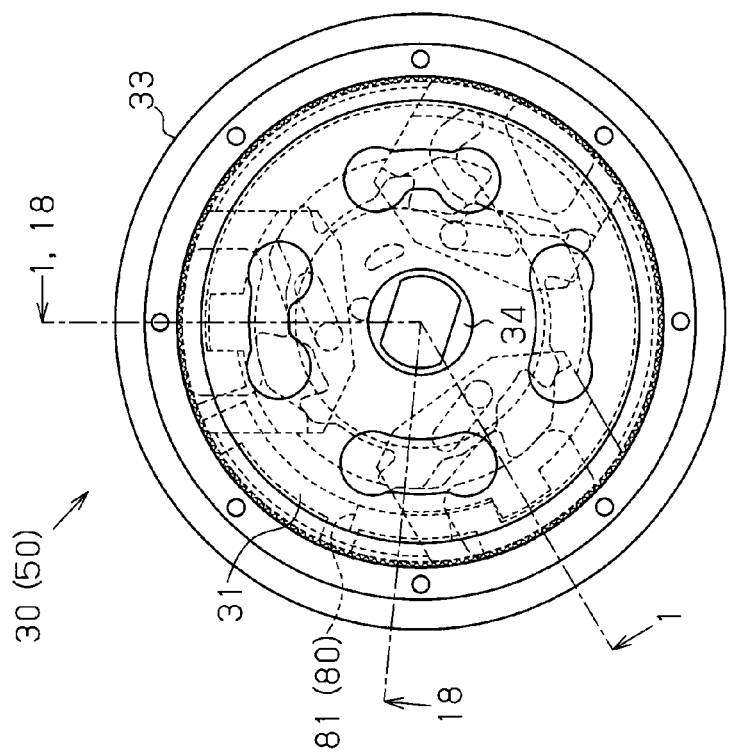
FIG. 6 is a front view of the seat reclining device.

The locking mechanism 30 includes, as shown in FIGS. 4 to 7, a first member 31 attached to the side frame 15A or 15B, a second member 32 attached to the support bracket 14D or 14E, and a holder 33 mounted to the first member 31 and the second member 32. The locking mechanism 30 further includes a cam 34, three pawls 35 as locking members, and a spiral spring 36. The cam 34 and the pawls 35 are located between the first member 31 and the second member 32. The spiral spring 36 is located on the opposite side of the second member 32 from the cam 34. The second member 32 is formed in an annular shape by a half blanking process. The second member 32 is secured to the seat cushion frame 14 via the support bracket 14D or 14E, as shown in FIG. 7.

Figure 4:
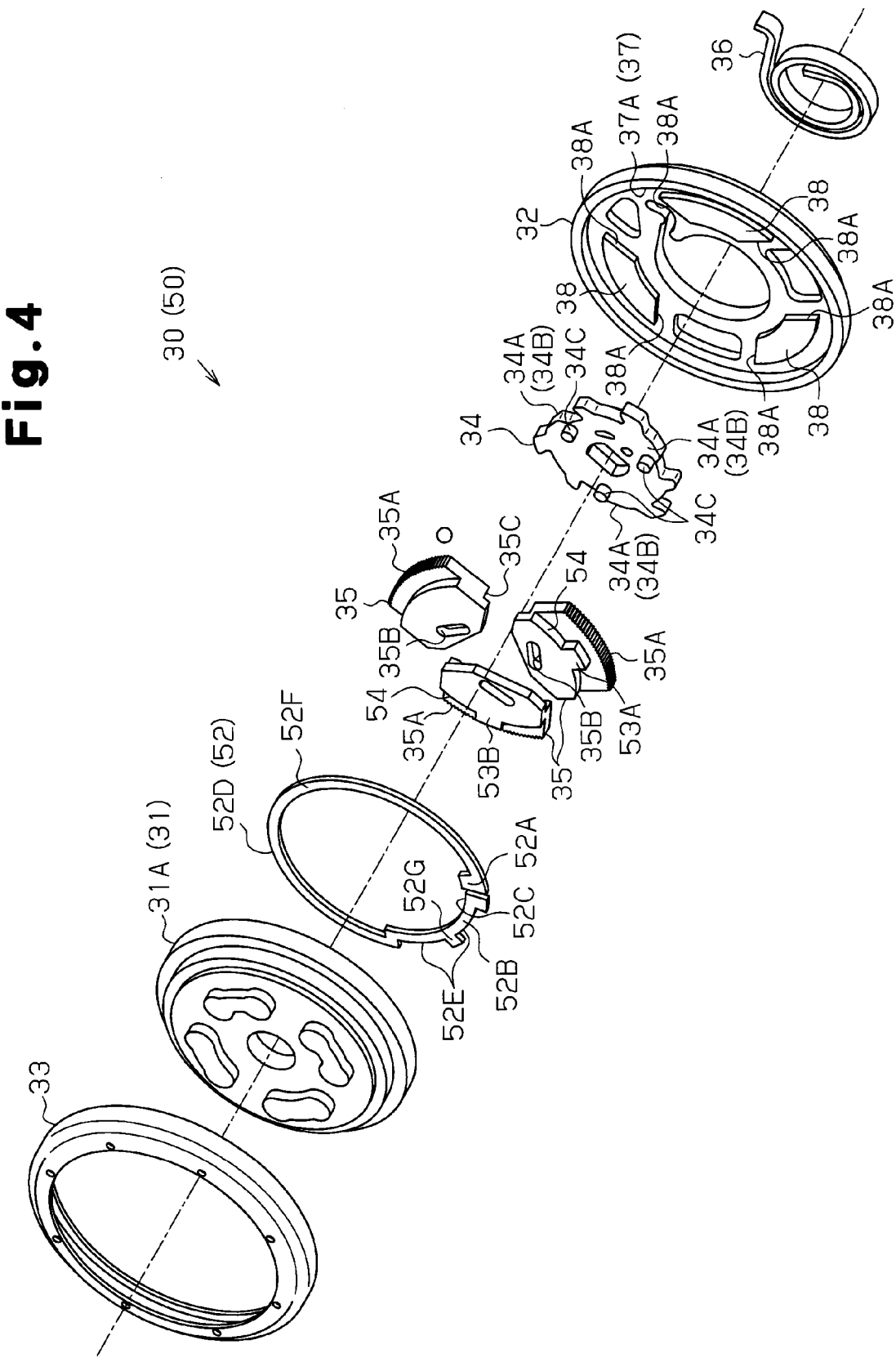
FIG. 4 is an exploded perspective view of a seat reclining device.
Figure 10:
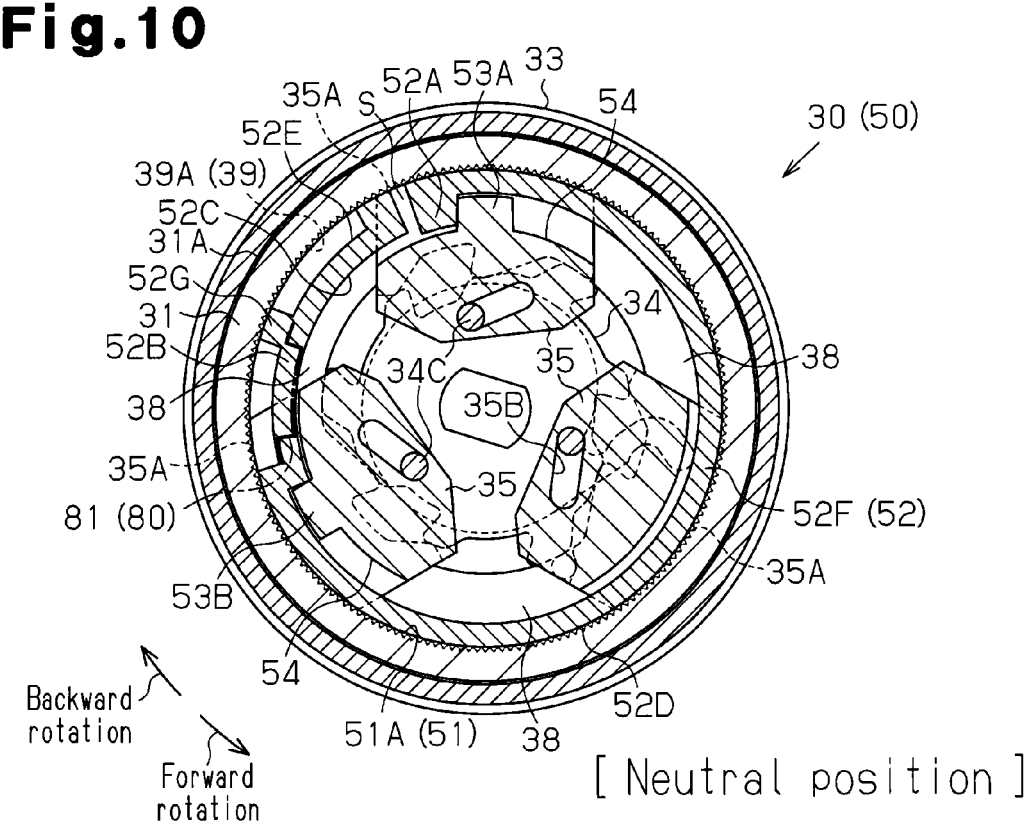
FIG. 10 is a cross-sectional view taken along line 10-10 of FIG. 7.
Figure 11:
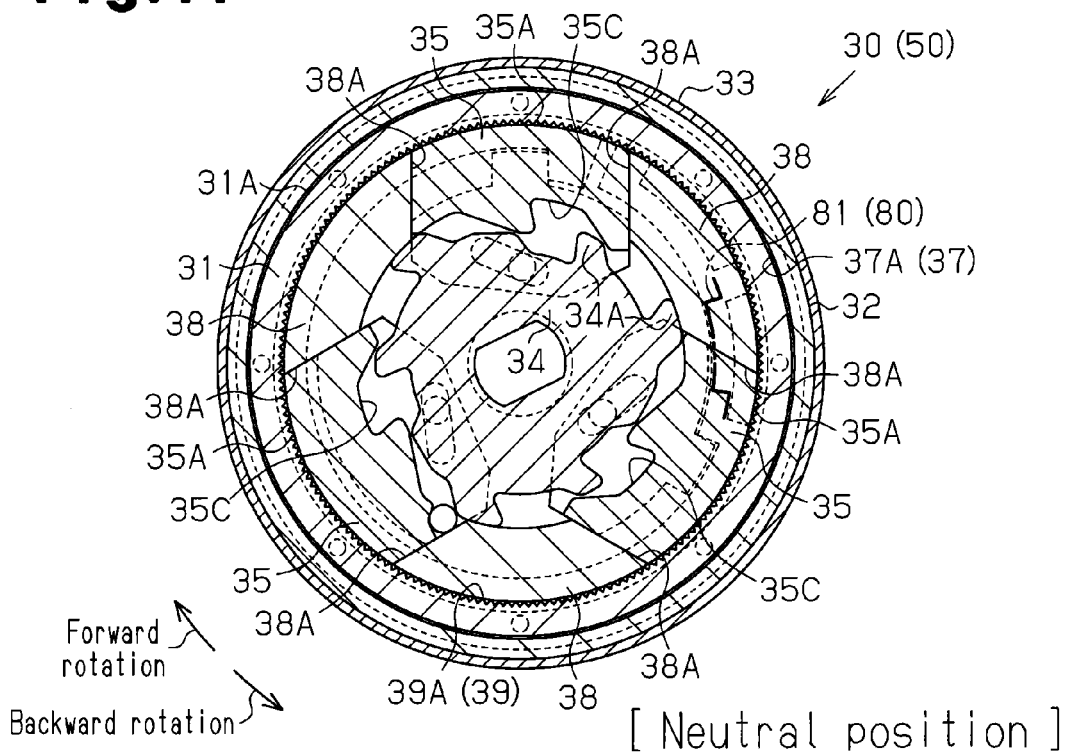
FIG. 11 is a cross-sectional view taken along line 11-11 of FIG. 7.

On the opposite side of the second member 32 from the support bracket 14D or 14E is formed a circular recess 37. In the recess 37 are formed three guide walls 38 at predetermined angular intervals, as shown in FIG. 4, FIGS. 10, and 11. Each guide wall 38 protrudes a predetermined height from the bottom wall of the second member 32. Side faces 38A of adjacent guide walls 38 are parallel to each other and extend straight in the radial direction. Radially extending guide grooves are thus formed between adjacent side faces 38A. The guide grooves guide the radial movement of the pawls 35. The first member 31 is formed in an annular shape by a half blanking process, as shown in FIGS. 5 and 7. The outer diameter of the first member 31 is the same as the inner diameter of the recess 37. The first member 31 is secured to the seat back frame 15 via the side frame 15A or 15B.

The first member 31 is fitted in the second member 32 with its outer circumferential surface 31A sliding on the inner circumferential surface 37A of the second member 32. The seat back frame 15 is rotationally connected to the seat cushion frame 14 via the first members 31 and the second members 32. The first member 31 rotates counterclockwise in FIG. 10 when tilting the seat back frame 15 forward. The first member 31 rotates clockwise in FIG. 10 when tilting the seat back frame 15 backward.

On the opposite side of the first member 31 from the side frame 15 is formed a first recess 39, which is circular and concentric with the second member 32. The first recess 39 has an internal gear 39A formed on its inner circumferential surface. When the first member 31 is fitted in the second member 32, the internal gear 39A is directed toward the guide grooves. In the first recess 39 is formed a second recess 41, which is concentric with the first recess 39, circular, and smaller in diameter than the first recess 39. The first recess 39 and the second recess 41, together with the recess 37, form a space for housing the cam 34 and the pawls 35. The holder 33 is formed in an annular shape. The holder 33 is fitted on the first member 31 and the second member 32 over the peripheries of the first and second members 31 and 32. The holder 33 supports the first member 31 and the second member 32 to be relatively rotational and not to come apart in the axial direction.

The cam 34 has three cam profile portions 34A around the rim at predetermined angular intervals, as shown in FIGS. 4 and 5. The cam profile portions 34A thus form a cam surface 34B with their outer surfaces. Each cam profile portion 34A has an axially protruding protrusion 34C. The cam 34 is encased between the second member 32 and the first member 31 to be rotational relative to the second member 32. The cam 34 rotates clockwise in FIG. 10 or counterclockwise in FIG. 11 with the operation shaft 16A or 16B in coordination with the movement of the first operation lever 61 or the second operation lever 62.

Figure 12:
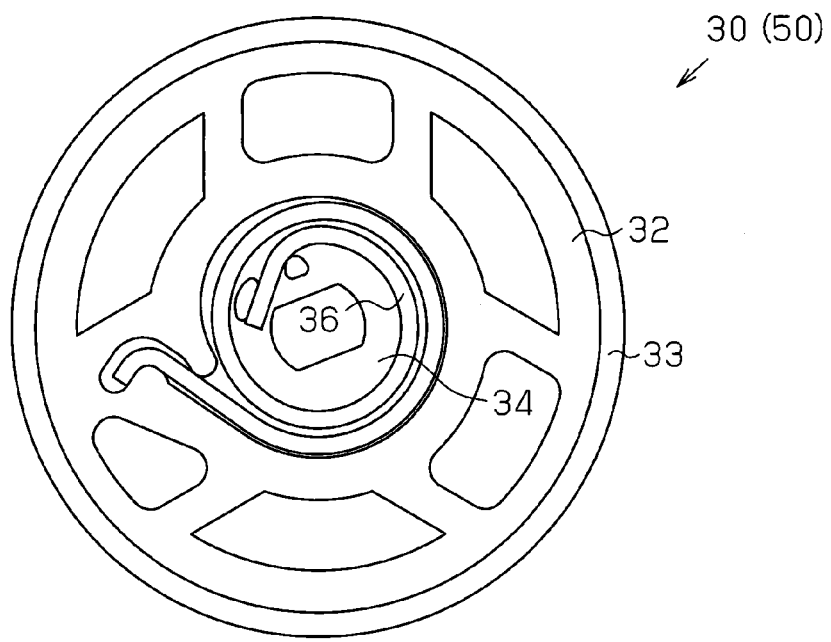
FIG. 12 is a rear view of the seat reclining device of FIG. 7 viewed in the direction of arrow D.

As shown in FIGS. 4, 5, and 12, the outer end of the spiral spring 36 is retained by the second member 32, while the inner end thereof is retained by the cam 34. The cam 34 rotates counterclockwise in FIG. 10 or clockwise in FIG. 11 by the urging force of the spiral spring 36 when the first operation lever 61 or the second operation lever 62 is released from an operating force. As the cam 34 rotates, external teeth 35A of the pawls 35 mesh with the internal gear 39A of the first member 31, whereby the seat back is locked. The outer end of the spiral spring 36 may be retained by the support bracket 14D or 14E of the seat cushion frame 14 instead of the second member 32.

The pawls 35 are each formed in a quadrate, planar shape, as shown in FIGS. 4, 5, 10, and 11. The pawls 35 each have a width somewhat smaller than the width of the guide grooves, i.e., distance between adjacent guide walls 38. One pawl 35 each is arranged in the guide groove. Each pawl 35 is radially guided, as they slide on the side faces 38A of the guide walls 38 on both sides. External teeth 35A to mesh with the internal gear 39A of the first member 31 are formed at the outer end of each pawl 35. A cam hole 35B is formed at the inner end of each pawl 35. Each cam hole 35B is inclined relative to the inner end face of the pawl 35. The protrusions 34C of the cam 34 are fitted in the cam holes 35B of the respective pawls 35. Thereby the pawls 35 are each engaged with the cam 34.

Each pawl 35 has a stepped portion between its external teeth 35A and the cam hole 35B. The inner end face of the stepped portion forms a pawl cam surface 35C. The pawl cam surface 35C extends across the side face of the pawl 35 and is inclined relative to the pitch circle of the external teeth 35A. The pawl 35 is engaged with the cam 34 by the pawl cam surface 35C abutting on the cam surface 34B.

When the cam 34 is rotated clockwise in FIG. 10 together with the operation shaft 16A or 16B, the inner circumferential surface of the cam holes 35B is pushed by the protrusions 34C of the cam 34. Accordingly, the pawls 35 each move radially inward along the guide grooves. This disengages the external teeth 35A of the pawls 35 from the internal gear 39A of the first member 31. The seat back is thus unlocked, as the first member 31 is made rotational relative to the second member 32. On the other hand, when the cam 34 rotates counterclockwise in FIG. 10, the pawl cam surfaces 35C are pressed by the cam surface 34B. Accordingly, the pawls 35 each move radially outward along the guide grooves. This causes the external teeth 35A of the pawls 35 to mesh with the internal gear 39A of the first member 31. The seat back is thus locked, as the first member 31 is not allowed to rotate relative to the second member 32.

A memory mechanism 50 remembers the angular position of the locked seat back where it is located immediately before being unlocked. The memory mechanism 50 locks the seat back only when it is tilted to the remembered angular position. The memory mechanism 50 includes engagement portions 53A and 53B, a housing recess 51, a memory plate 52, and a pair of engagement receiving portions 52A and 52B. The engagement portions 53A and 53B are respectively provided to each of a pair of pawls 35.

As shown in FIG. 10, the engagement portions 53A and 53B are each provided to adjacent pair of pawls 35. The pawls 35 have a stepped portion 54 on the opposite side from the pawl cam surfaces 35C, as shown in FIGS. 4 and 5. The stepped portion 54 is positioned between the external teeth 35A and the cam hole 35B. The engagement portions 53A and 53B are each positioned substantially at the center of the stepped portion 54 of each pawl 35. The engagement portion 53A protrudes radially outward from the stepped portion 54 much more than the engagement portion 53B.

Figure 8:
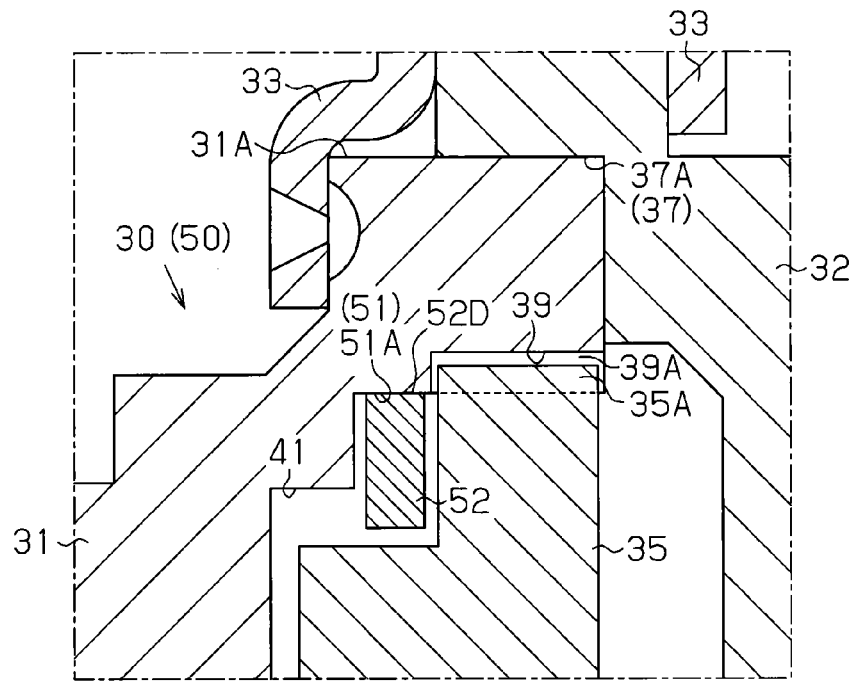
FIG. 8 is an enlarged partial cross-sectional view illustrating part of FIG. 7.

As shown in FIG. 8, the housing recess 51 is provided on the opposite side of the meshing part of the internal gear 39A and the external teeth 35A from the second member 32. The housing recess 51 is provided on the opposite side of the first recess 39 from the second member 32. The housing recess 51 is concentric with the first recess 39 and has an inner circumferential surface 51A with the same diameter as the diameter of the addendum circle of the internal gear 39A.

Figure 13:
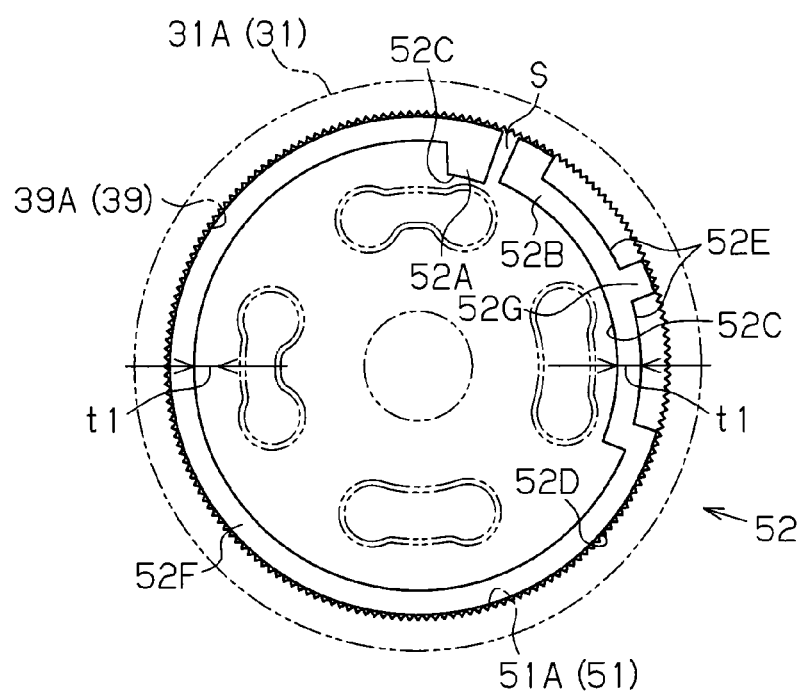
FIG. 13 is a rear view of a memory plate in the seat reclining device of FIG. 7 viewed in the direction of arrow D.

The memory plate 52 is formed in an annular shape that is cut at one point, as shown in FIGS. 10 and 13. The memory plate 52 is therefore flexibly deformable in a radial direction. The cut portion S of the memory plate 52 is positioned between the engagement portions 53A and 53B. The memory plate 52 is housed in the housing recess 51 while being reduced in diameter. The memory plate 52 is slidable in the circumferential direction inside the housing recess 51. The engagement receiving portions 52A and 52B are positioned between the engagement portions 53A and 53B. The engagement receiving portions 52A and 52B each protrude radially inward from their respective positions on the memory plate 52 adjacent to the engagement portions 53A and 53B. As the pawls 35 move in the radial direction, the corresponding engagement portions 53A and 53B engage with and disengage from the engagement receiving portions 52A and 52B, respectively.

Referring to the side toward which the first member 31 is rotated when the seat back is tilted forward as front side, the engagement receiving portion 52B on the front side is located at one end of the memory plate 52, adjacent to the front-side engagement portion 53B. The engagement receiving portion 52A on the rear side is located at the other end of the memory plate 52, adjacent to the rear-side engagement portion 53A.

The radial dimension of the engagement receiving portions 52A and 52B, and the protruding amount of the engagement portions 53A and 53B from the stepped portion 54, determine whether the engagement portions 53A and 53B can ride over the engagement receiving portions 52A and 52B and slide. The radial dimension of the engagement receiving portions 52A and 52B also determines whether or not an angular position of the seat back can be remembered. The radial dimension of the engagement receiving portion 52B is set such that the engagement portion 53B with a smaller protruding amount from the stepped portion 54 can ride over it. The radial dimension of the engagement receiving portion 52A is set such that the engagement portion 53A with a larger protruding amount cannot ride over it. The circumferential length of the engagement receiving portions 52A and 52B determines the tilting range of the seat back for the memory mechanism 50 to remember a position. The engagement receiving portion 52B for the engagement portion 53B to ride over it and slide is formed longer in the circumferential direction. The engagement receiving portion 52A, which is not ridden over by the engagement portion 53A, is formed shorter in the circumferential direction.

Figure 20:
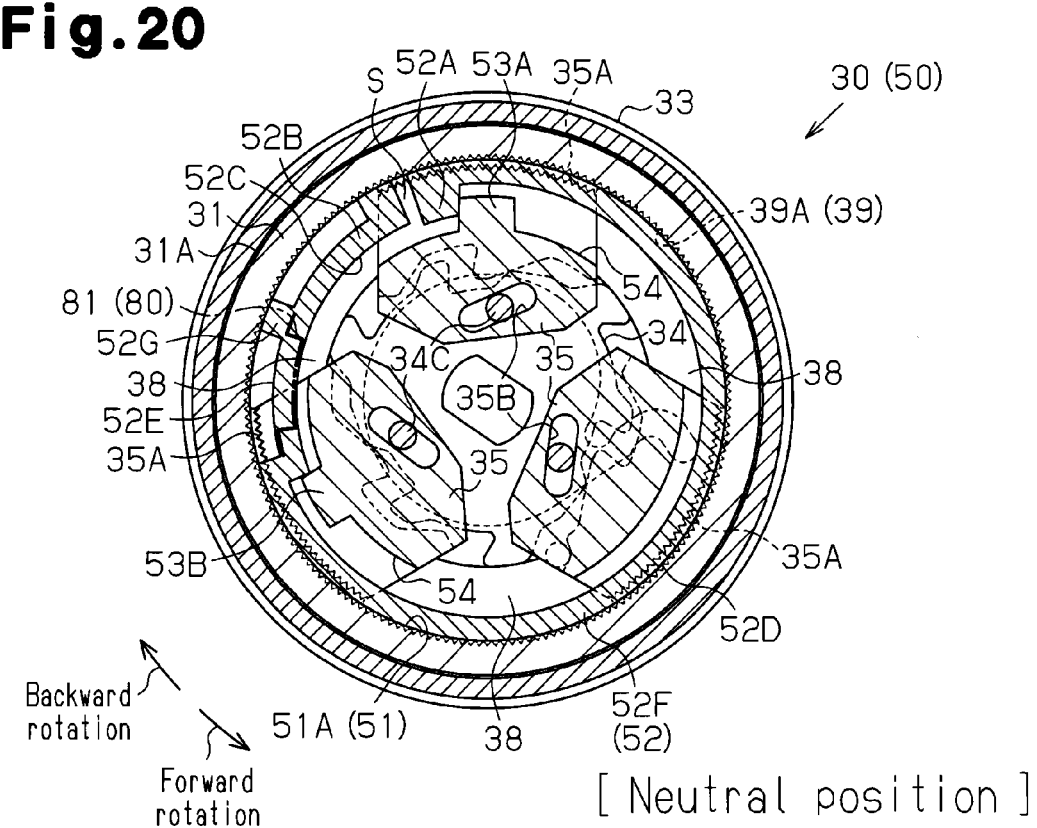
FIG. 20 is a cross-sectional view illustrating a seat reclining device that has unlocked the seat back so that it can be tilted without an angular position being remembered.

The unlocked state of the locking mechanism 30 can take the following two forms:

Form 1: Both engagement portions 53A and 53B are half engaged with the engagement receiving portions 52A and 52B, and circumferentially press the engagement receiving portions 52A and 52B as shown in FIG. 20. Therefore, as the memory plate 52 rotates with the pawls 35 inside the housing recess 51, the seat back is allowed to tilt without an angular position being remembered.

Form 2: The engagement portion 53B rides over the engagement receiving portion 52B so that the memory plate 52 cannot rotate relative to the housing recess 51, and the engagement portion 53B slides on the inner circumferential surface 52C of the engagement receiving portion 52B. Therefore, the seat back is allowed to tilt with an angular position being remembered (see FIG. 22). In this form, the friction resistance between the outer circumferential surface 52D of the memory plate 52 and the circular inner circumferential surface 51A of the housing recess 51 is greater than the friction resistance between the inner circumferential surface 52C of the engagement receiving portion 52B and the engagement portion 53B.

As shown in FIG. 13, an arcuate cutout 52E is provided on the outer circumference of the engagement receiving portion 52B. By forming this arcuate cutout 52E, the radial thickness t1 of the memory plate 52 is made the same both in a portion 52F between the engagement receiving portions 52A and 52B of the memory plate 52 and in the engagement receiving portion 52B. A leg 52G is provided to prevent the engagement receiving portion 52B from flexing when the engagement portion 53B slides on the engagement receiving portion 52B.

Figure 15:
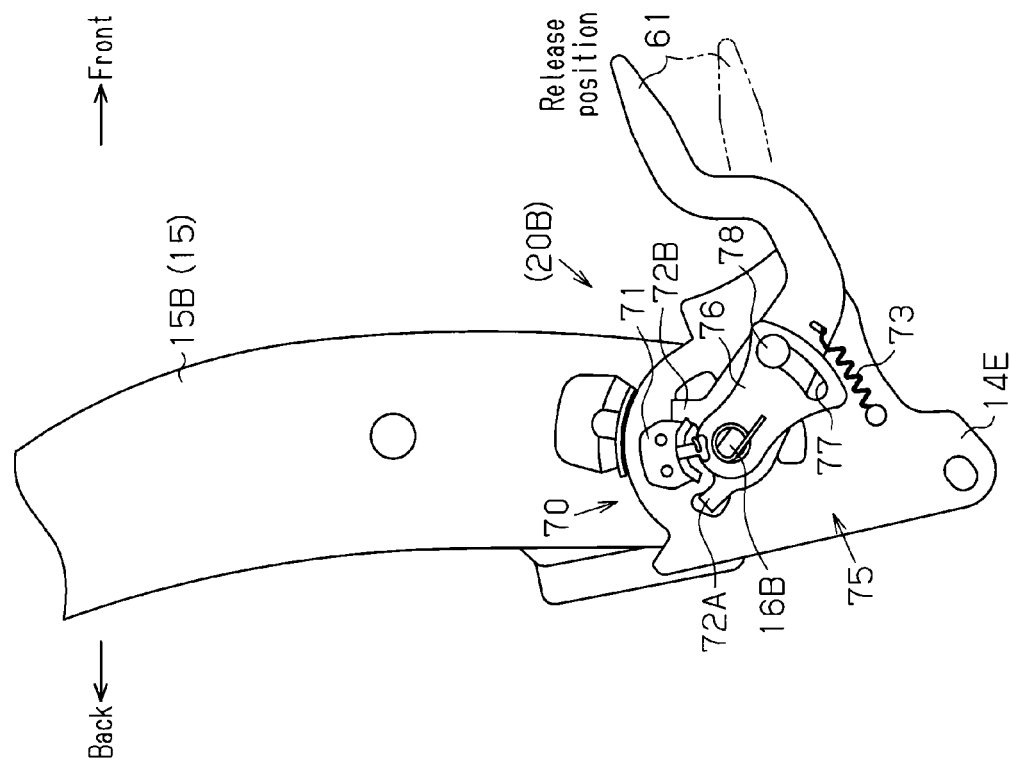
FIG. 15 is a partial side view of the same when the first operation lever is moved to a release position.
Figure 14:
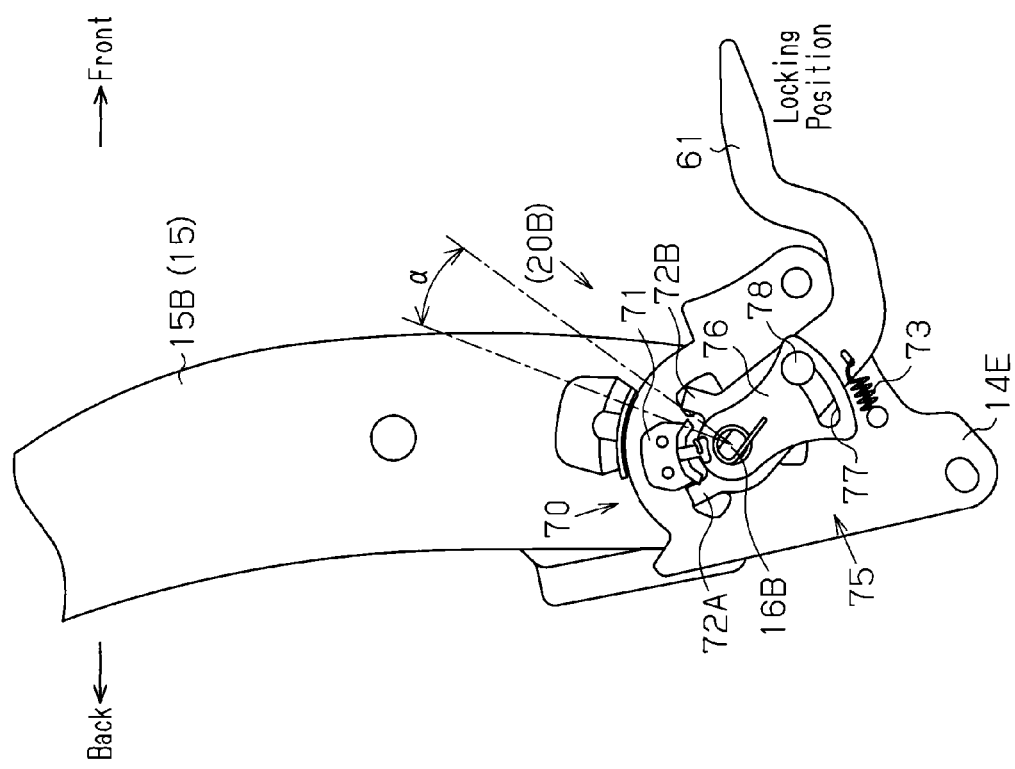
FIG. 14 is a partial side view illustrating the vicinity of an operation shaft on the right side of the vehicle seat device.

As shown in FIGS. 1 and 2, the vehicle seat device includes a first operation lever 61 (unlock operation lever), a second operation lever 62 (memory operation lever), and a seat sliding device 69. The first operation lever 61 is operated for unlocking the seat back so that it can be tilted without an angular position being remembered, as in Form 1 mentioned above. The first operation lever 61 is provided on the right side of the seat cushion. As shown in FIGS. 14 and 15, part of the operation shaft 16B of the seat reclining device 20B is protruded from the right-side support bracket 14E. The first operation lever 61 is supported to be rotational relative to the operation shaft 16B. A mechanism that transmits the movement of the first operation lever 61 to the operation shaft 16B is provided between the first operation lever 61 and the operation shaft 16B.

As shown in FIG. 1, the second operation lever 62 is primarily used to unlock the seat so that it can be tilted with an angular position being remembered, by rotating the operation shafts 16A and 16B more largely than they are in Form 1. The second operation lever 62 is also operated for unlocking the seat back so that it can be tilted without an angular position being remembered. The second operation lever 62 is provided on the right side of the seat back. The second operation lever 62 is supported on the cross member 15D to be rotational upward and downward around a shaft 63. The second operation lever 62 is urged by a return spring 64 to rotate always downward. The cross member 15D has stoppers 67A and 67B above and below the second operation lever 62, respectively. The stoppers 67A and 67B define the operating range of the second operation lever 62.

As shown in FIGS. 16 and 17, part of the operation shaft 16A of the seat reclining device 20A is protruded from the left-side support bracket 14D. A link member 65 is connected to the operation shaft 16A. The link member 65 is urged in a direction in which the operation shaft 16A is rotated to lock the seat back by the spiral spring 36 shown in FIGS. 4 and 5. The link member 65 is urged counterclockwise in FIGS. 16 and 17. The second operation lever 62 is connected to the outer end of the link member 65 via a cable 68. Therefore, the movement of the second operation lever 62 is transmitted to the operation shaft 16A via the cable 68 and the link member 65. The middle part of the cable 68 is not shown in FIGS. 1 to 3.

The seat sliding device 69 shown in FIGS. 1 and 2 includes a known slide lock mechanism that restricts or allows the sliding movement of the seat cushion relative to the vehicle floor. The slide lock mechanism restricts the sliding movement of the seat cushion relative to the vehicle floor at least in the seating region. The slide lock mechanism permits the sliding movement of the seat cushion in coordination with the tilting movement of the seat back from the seating region into the forward folding region, after the seat back is unlocked by the locking mechanism upon the second operation lever 62 being operated. As shown in FIGS. 14 and 15, the vehicle seat device includes operating range limiting means 70 and a lost motion mechanism 75 in the vicinity of the first operation lever 61.

The operating range limiting means 70 is provided to the right-side support bracket 14E. The operating range limiting means 70 includes a fixed stopper 71 and a pair of movable stoppers 72A and 72B. The movable stoppers 72A and 72B are arranged around the operation shaft 16B of the first operation lever 61 with a predetermined interval therebetween. The movable stoppers 72A and 72B each protrude radially outward. The operating range a of the first operation lever 61 is limited to between a locking position (see FIG. 14), where the movable stopper 72A abuts on the fixed stopper 71, and a release position (see FIG. 15), where the movable stopper 72B abuts on the fixed stopper 71. This makes it possible to unlock the seat back so that it can be tilted without an angular position being remembered, when the first operation lever 61 is operated to rotate the operation shafts 16A and 16B. At the locking position, the external teeth 35A of the pawls 35 mesh with the internal gear 39A of the first member 31. The seat back is thereby locked, as the first member 31 is not allowed to rotate relative to the second member 32. At the release position, the external teeth 35A are disengaged from the internal gear 39A. The seat back is thereby unlocked, as the first member 31 is allowed to rotate relative to the second member 32.

A return spring 73 is provided between the first operation lever 61 and the support bracket 14E. The return spring 73 urges the first operation lever 61 to rotate it toward the locking position. The rotation amount of the operation shafts 16A and 16B when unlocking the seat back to tilt it with an angular position being remembered is greater than the rotation amount of the operation shafts 16A and 16B when unlocking the seat back to tilt it without remembering an angular position. In this embodiment, the seat back is unlocked so that it can be tilted without an angular position being remembered, primarily by operating the first operation lever 61. The second operation lever 62 is operated for unlocking the seat back so that it can be tilted with an angular position being remembered. Therefore, the rotation amount of the operation shafts 16A and 16B when the second operation lever 62 is operated is greater than the rotation amount of the operation shafts 16A and 16B when the first operation lever 61 is operated. The operation shafts 16A and 16B rotated by the first operation lever 61 are the same operation shafts 16A and 16B rotated by the second operation lever 62.

The lost motion mechanism 75 allows the operation shafts 16A and 16B to be rotated by a greater amount than when the first operation lever 61 is operated without transmitting the movement of the second operation lever 62 to the first operation lever 61. Namely, the lost motion mechanism 75 puts the first operation lever 61 in a non-operational state without transmitting the movement of the second operation lever 62 to the first operation lever 61, when the second operation lever 62 is operated to unlock the seat back so that it can be tilted with an angular position being remembered. The lost motion mechanism 75 includes a link member 76, an oblong hole 77, a pin 78, and the cable 68. The first operation lever 61 is supported to be rotational relative to the operation shaft 16B. The link member 76 is connected to the operation shaft 16B. The link member 76 is urged by the spiral spring 36 in a direction in which the operation shaft 16B is rotated to lock the seat back. That is, the link member 76 is urged clockwise in FIGS. 14 and 15.

The oblong hole 77 is formed in the link member 76. The oblong hole extends along an arc around the operation shaft 16B. The pin 78 is secured to the first operation lever 61. The pin 78 can move in the circumferential direction inside the oblong hole 77. When the first operation lever 61 is operated within the rotating operating range α, the pin 78 is pressed to the front end of the oblong hole 77. This is because the link member 76 is urged clockwise in FIG. 14 by the spiral spring 36. Therefore, as long as the first operation lever 61 is operated within the rotating operating range α, the link member 76 rotates with the first operation lever 61. The operation shaft 16B, the rod 22, the operation shaft 16A, and the link member 65 also rotate in the same direction as the link member 76.

Although the link member 65 rotates clockwise from the state shown in FIG. 16, this rotation of the link member 65 is not transmitted to the second operation lever 62, as the cable 68 sags. When the second operation lever 62 is operated, the pin 78 is allowed to move inside the oblong hole 77. As the pin 78 moves inside the oblong hole 77, the movement of the second operation lever 62 is not transmitted to the first operation lever 61, and the first operation lever 61 is put in a non-operational state.

Figure 19:
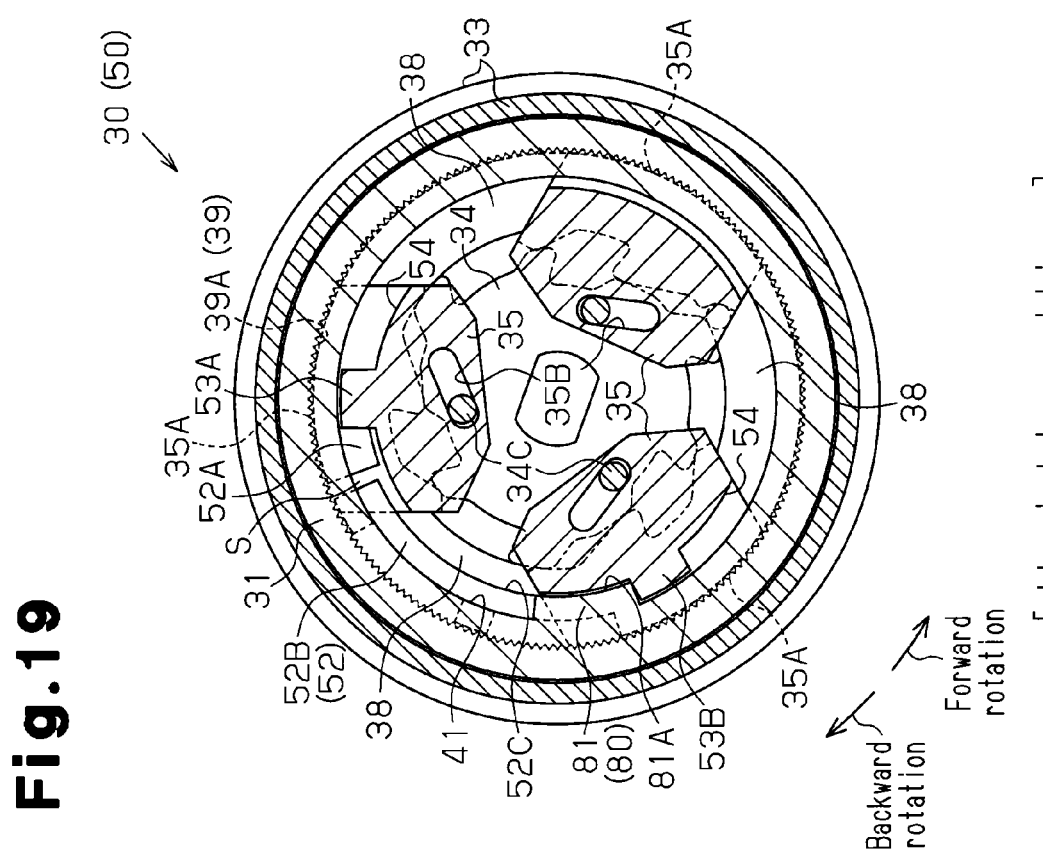
FIG. 19 is a cross-sectional view taken along line 19-19 of FIG. 18.
Figure 18:
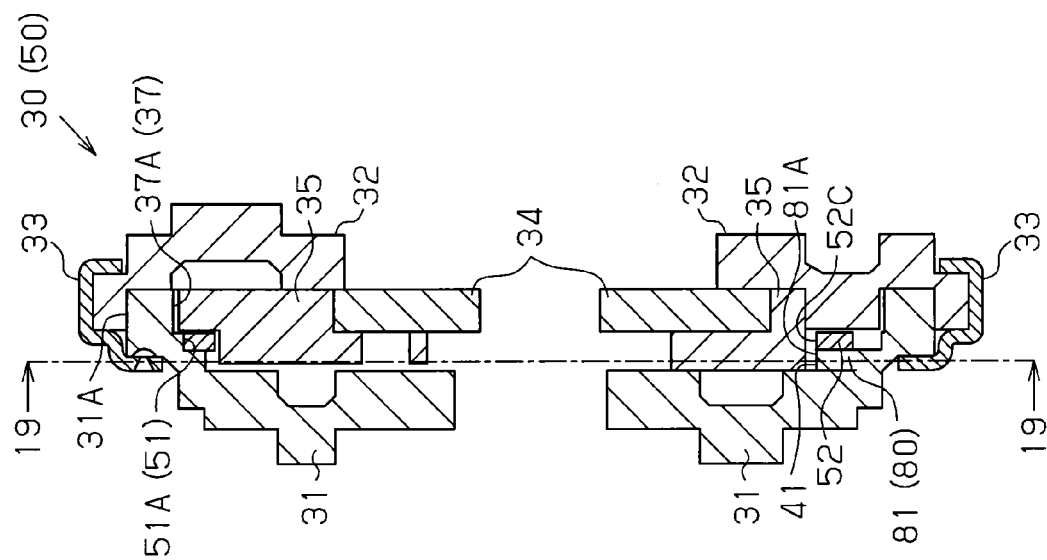
FIG. 18 is a cross-sectional view taken along line 18-18 of FIG. 6.

As shown in FIGS. 5, 18, and 19, the vehicle seat device further includes a switch limit mechanism 80. With the switch limit mechanism 80, the switching between the locked and unlocked states by the locking mechanism 30 can be limited to be performed only when the seat back is tilted within the seating region, when the first operation lever 61 is operated. The switch limit mechanism 80 includes a rotation restricting portion 81 provided to the first member 31. The rotation restricting portion 81 is an arcuate protrusion protruding radially inward from the inner circumferential surface of the second recess 41. The rotation restricting portion 81 is positioned to abut on the engagement portion 53B of the pawl 35 when the seat back, having been unlocked to tilt without an angular position being remembered, is tilted forward to the upright position. Since the rotation restricting portion 81 restricts the rotation of the engagement portion 53B and the memory plate 52, the seat back is stopped from tilting from the seating region into the forward folding region in the case with Form 1.

In this way, the rotation restricting portion 81 restricts the rotation of the memory plate 52 and the pawl 53 when the seat back is tilted from the seating region into the forward folding region, in the unlocked state where the seat back is allowed to tilt without an angular position being remembered. Accordingly, the switching between the locked and unlocked states by the locking mechanism 30 is limited to be performed only when the seat back is tilted within the seating region.

The inner circumferential surface 81A of the rotation restricting portion 81 has the same diameter as that of the inner circumferential surface 52C of the engagement receiving portion 52B. This is for allowing the seat back to tilt from the seating region into the forward folding region when the second operation lever 62 is operated. In this case, the engagement portion 53B can ride over the engagement receiving portion 52B and the rotation restricting portion 81 and slide on the inner circumferential surface 52C of the engagement receiving portion 52B. The second recess 41 where the rotation restricting portion 81 is provided is located on the opposite side of the housing recess 51 from the second member 32. Therefore the rotation restricting portion 81 does not impede the rotation of the memory plate 52 inside the housing recess 51.

As mentioned above, the engagement portion 53A protrudes largely outward in the radial direction from the stepped portion 54. The engagement receiving portion 52A adjacent to the engagement portion 53A is short in the circumferential direction and large in the radial direction. In contrast, the engagement portion 53B protrudes outward in the radial direction from the stepped portion 54 by a smaller amount. The engagement receiving portion 52B adjacent to the engagement portion 53B is long in the circumferential direction and small in the radial direction. Therefore, when the seat back is tilted forward, the engagement portion 53B with a smaller protruding amount rides over the radially short engagement receiving portion 52B, so that the angular position of the seat back is remembered. When the seat back is tilted backward, the engagement portion 53A with a larger protruding amount does not ride over the radially long engagement receiving portion 52A, so that the angular position of the seat back is not remembered, and the seat back can be locked at any angular position.

The above-described vehicle seat device operates as will be described below:

As shown in FIG. 13, when the seat back is unlocked and allowed to tilt with an angular position being remembered, the engagement portion 53B of the pawl 35 slides on the inner circumferential surface 52C of the engagement receiving portion 52B. The engagement receiving portion 52B is positioned inner than the portion 52F between the engagement receiving portions 52A and 52B of the memory plate 52. If the outer diameter of the memory plate 52 were the same all around, the radial thickness t1 would be larger in the engagement receiving portion 52B than that in the portion 52F between the engagement receiving portions 52A and 52B. The memory plate 52 would be harder to flex radially if the thickness t1 were larger. The memory plate 52 may then be distorted when it is flexed and assembled into the housing recess 51. There would therefore be a possibility that the memory plate 52 could not be fitted into the housing recess 51. In this respect, in the first embodiment, the thickness t1 is set the same in the portion 52F between the engagement receiving portions 52A and 52B and in the engagement receiving portion 52B where the engagement portion 53B slides. Therefore, the memory plate 52 will not be distorted but can be flexed and assembled into the housing recess 51.

The seat reclining devices 20A and 20B provided on both sides of the seat cushion have the same locking mechanism 30 and memory mechanism 50. The operation shafts 16A and 16B in the respective seat reclining devices 20A and 20B for operating the locking mechanisms 30 and the memory mechanisms 50 are connected to each other by the rod 22. Therefore, when the first operation lever 61 or the second operation lever 62 is operated and the operation shafts 16A and 16B are rotated, the locking mechanisms 30 and the memory mechanisms 50 of both seat reclining devices 20A and 20B work in synchronism.

FIGS. 10 and 11 illustrate the seat reclining devices 20A and 20B when the seat back is locked at the neutral position in the seating region. In this case, the pawls 35 attached to the second member 32 are all pressed radially outward by the cam 34. Thereby, the external teeth 35A of the pawls 35 are meshed with the internal gear 39A of the first member 31. The first member 31 is thus restricted to rotate relative to the second member 32, i.e., the seat back is stopped from tilting relative to the seat cushion. At this time, the first operation lever 61 is urged clockwise in FIG. 14 by the return spring 73. Therefore, the lever stays in the locking position, with the left-side movable stopper 72A abutting on the fixed stopper 71. The link member 76 is urged clockwise in FIG. 14 by the spiral spring 36. Therefore, the link member 76 stays in position, with the pin 78 on the first operation lever 61 abutting the front end of the oblong hole 77.

To adjust the angular position of the seat back from this locked state by unlocking and allowing the seat back to tilt without remembering the angular position, the first operation lever 61 at the locking position is manually pulled upward. The upward rotation of the first operation lever 61 is stopped at the release position shown in FIG. 15 when the right-side movable stopper 72B abuts on the fixed stopper 71. When the first operation lever 61 is being moved to the release position, the link member 76 is urged to rotate clockwise in FIG. 14 by the spiral spring 36. Therefore, the pin 78 is retained at the front end of the oblong hole 77. Accordingly, the link member 76 rotates with the first operation lever 61. The operation shaft 16B, the rod 22, the operation shaft 16A, and the link member 65 also rotate in the same direction as the link member 76. Although the link member 65 rotates clockwise from the state shown in FIG. 16, this rotation of the link member 65 is not transmitted to the second operation lever 62 since the cable 68 sags.

When the first operation lever 61 is moved from the locking position to the release position, both cams 34 rotate clockwise in FIG. 20 with the operation shafts 16A and 16B. Since the protrusions 34C of the cams 34 press the inner circumferential surface of the cam holes 35B, the pawls 35 each move radially inward in the guide grooves. At an early stage of this period in which the pawls 35 move, the external teeth 35A of the pawls 35 disengage from the internal gear 39A of the first member 31. The seat back is thereby unlocked, as the first member 31 is allowed to rotate relative to the second member 32. As each pawl 35 moves inward, the engagement portions 53A and 53B of the pawls 35 also move radially inward. This reduces the amount of engagement between the engagement portions 53A and 53B and the engagement receiving portions 52A and 52B.

When the first operation lever 61 has been moved to the release position, the engagement portions 53A and 53B engage with the engagement receiving portions 52A and 52B in about half an amount of engagement in the locked state, as shown in FIG. 20. Namely, the engagement portions 53A and 53B are both half engaged with the engagement receiving portions 52A and 52B. As the first operation lever 61 is operated to rotate the operation shafts 16A and 16B, the seat back is unlocked and allowed to tilt without an angular position being remembered. When the seat back is tilted forward in this state, the first member 31 rotates counterclockwise in FIG. 20, whereby the engagement receiving portion 52B is pressed by the engagement portion 53B. Contrarily, when the seat back is tilted backward, the first member 31 rotates clockwise in FIG. 20, whereby the engagement receiving portion 52A is pressed by the engagement portion 53A. When the seat back is tilted, whether forward or backward, the pressure by the engagement portion 53A or 53B surmounts the friction resistance between the outer circumferential surface 52D of the memory plate 52 and the inner circumferential surface 51A of the housing recess 51. Therefore, the memory plate 52 rotates with the pawls 35, to slide on the inner circumferential surface 51A of the housing recess 51.

Once the seat back is placed at a given angular position in the tilting region, the switching between the locked and unlocked states by the locking mechanism 30 is achieved by the first operation lever 61. There is a possibility here that, in adjusting the inclination angle of the seat back by operating the first operation lever 61, the seat back may be accidentally tilted in the forward folding region, whereupon the restriction of the sliding movement by the slide lock mechanism may be canceled. In this respect, in the first embodiment, the seat back in the neutral position is allowed to tilt forward or backward within the seating region. When the angular position of the seat back is adjusted in this seating region, the rotation restricting portion 81 of the first member 31 does not abut on the engagement portion 53B of the pawl 35 that rotates with the memory plate 52, as indicated by lines in which a long dash alternates with a pair of short dashes in FIG. 10. That is, the rotation restricting portion 81 does not inhibit rotation of the engagement portion 53B of the pawl 35 and the memory plate 52. On the other hand, when the seat back is tilted from the neutral position to the upright position, the rotation restricting portion 81 abuts on the engagement portion 53B of the pawl 35 that is rotating with the memory plate 52, as shown in FIG. 19. Thereby, the rotation restricting portion 81 restricts further rotation of the engagement portion 53B and the memory plate 52. Therefore, within the forward folding region which is further in the front of the upright position, the switching between the locked and unlocked states by the locking mechanism 30 is restricted, to prevent the inclination angle of the seat back from being adjusted.

In the first embodiment, the cut portion S of the memory plate 52 is positioned between the engagement portions 53A and 53B of an adjacent pair of pawls 35. The engagement receiving portions 52A and 52B of the memory plate 52 are positioned between the engagement portions 53A and 53B. The engagement receiving portions 52A and 52B are respectively adjacent to the engagement portions 53A and 53B. That is, the engagement receiving portion 52A is positioned between the cut portion S and the engagement portion 53A, while the engagement receiving portion 52B is positioned between the cut portion S and the engagement portion 53B. By this positional relationship, when the engagement portion 53A presses the engagement receiving portion 52A counterclockwise in FIG. 19, the other engagement portion 53B does not press the engagement receiving portion 52B circumferentially. The engagement portion 53A presses the engagement receiving portion 52A in a direction in which the space of the cut portion S of the memory plate 52 is reduced. Contrarily, when the engagement portion 53B presses the engagement receiving portion 52B clockwise in FIG. 19, the other engagement portion 53A does not press the engagement receiving portion 52A circumferentially. The engagement portion 53B presses the engagement receiving portion 52B in a direction in which the space of the cut portion S of the memory plate 52 is reduced. In this way, the memory plate 52 is reduced in diameter when the seat back is tilted, by the pressure applied in a direction in which the space of the cut portion S is reduced. Thereby, the friction between the outer circumferential surface 52D of the memory plate 52 and the inner circumferential surface 51A of the housing recess 51 is reduced.

In the first embodiment, as shown in FIG. 13, the thickness t1 of the memory plate 52 is set the same in the portion 52F between the engagement receiving portions 52A and 52B and in the engagement receiving portion 52B where the engagement portion 53B slides. Therefore, the memory plate 52 is not easily distorted when the memory plate 52 rotates with the pawls 35 as the engagement portion 53B presses the engagement receiving portion 52B. No excessive friction is therefore generated between the outer circumferential surface 52D of the memory plate 52 and the inner circumferential surface 51A of the housing recess 51.

Once the seat back is set at a desired inclination angle, when the first operation lever 61 is stopped from being pulled up as shown in FIGS. 14 and 15, the first operation lever 61 is rotated downward by the return spring 73. The lever therefore stops at the locking position, with the left-side movable stopper 72A abutting on the fixed stopper 71. When the first operation lever 61 returns from the release position to the locking position, the link member 76 is urged clockwise in FIG. 14 by the spiral spring 36. Therefore, the pin 78 does not move in the oblong hole 77 and is retained at the front end of the oblong hole 77. Accordingly, the link member 76 rotates clockwise in FIG. 14 with the first operation lever 61. The operation shaft 16B, the rod 22, the operation shaft 16A, and the link member 65 also rotate in the same direction as the link member 76. Although the link member 65 rotates counterclockwise from the state shown in FIG. 17, this rotation of the link member 65 is not transmitted to the second operation lever 62, since the cable 68 that has been sagged is pulled.

The cam 34 rotates counterclockwise in FIG. 20 at this time, as it is urged by the spiral spring 36. Since the cam surface 34B presses the pawl cam surfaces 35C, the pawls 35 each protrude radially along the guide grooves. The external teeth 35A of the pawls 35 thereby mesh with the internal gear 39A of the first member 31, thus restricting the first member 31 from rotating relative to the second member 32. The seat back is thus locked. At this time, the engagement portions 53A and 53B of the pawls 35 engage with the engagement receiving portions 52A and 52B by a larger amount.

It is now assumed that the seat back is tilted forward, from the locked state at the neutral position in FIGS. 10 and 11, by unlocking and allowing the seat back to tilt, with its angular position being remembered. In this case, the second operation lever 62 shown in FIG. 1 is manually moved upward. The movement of the second operation lever 62 is transmitted to the link member 65 of the left-side seat reclining device 20A via the cable 68. The link member 65 rotates clockwise in FIGS. 16 and 17 with the operation shaft 16A. The rotation of the operation shaft 16A is transmitted to the operation shaft 16B of the right-side seat reclining device 20B via the rod 22. The operation shaft 16B thereby rotates counterclockwise in FIGS. 14 and 15 with the link member 76. The link member 76 is connected to the first operation lever 61 via the oblong hole 77 and the pin 78. Therefore, the rotating movement of the link member 76 is not transmitted to the first operation lever 61 unless the rear end of the oblong hole 77 abuts on the pin 78. Accordingly, while the operation shaft 16B rotates, the first operation lever 61 does not rotate, during the period in which the pin 78 moves inside the oblong hole 77.

As the second operation lever 62 is operated to rotate both operation shafts 16A and 16B, both cams 34 rotate with the operation shafts 16A and 16B clockwise in FIG. 20 relative to the first member 31. Since the protrusions 34C of the cams 34 press the cam holes 35B of the pawls 35, the pawls 35 each move radially inward in the guide grooves. This disengages the external teeth 35A of the pawls 35 from the internal gear 39A of the first member 31. The seat back is thus unlocked, as the first member 31 is made rotational relative to the second member 32. As the second operation lever 62 is pulled up, the pawls 35 each move radially inward. The engagement portions 53A and 53B of the pawls 35 engage with the engagement receiving portions 52A and 52B by a smaller amount.

Figure 21:
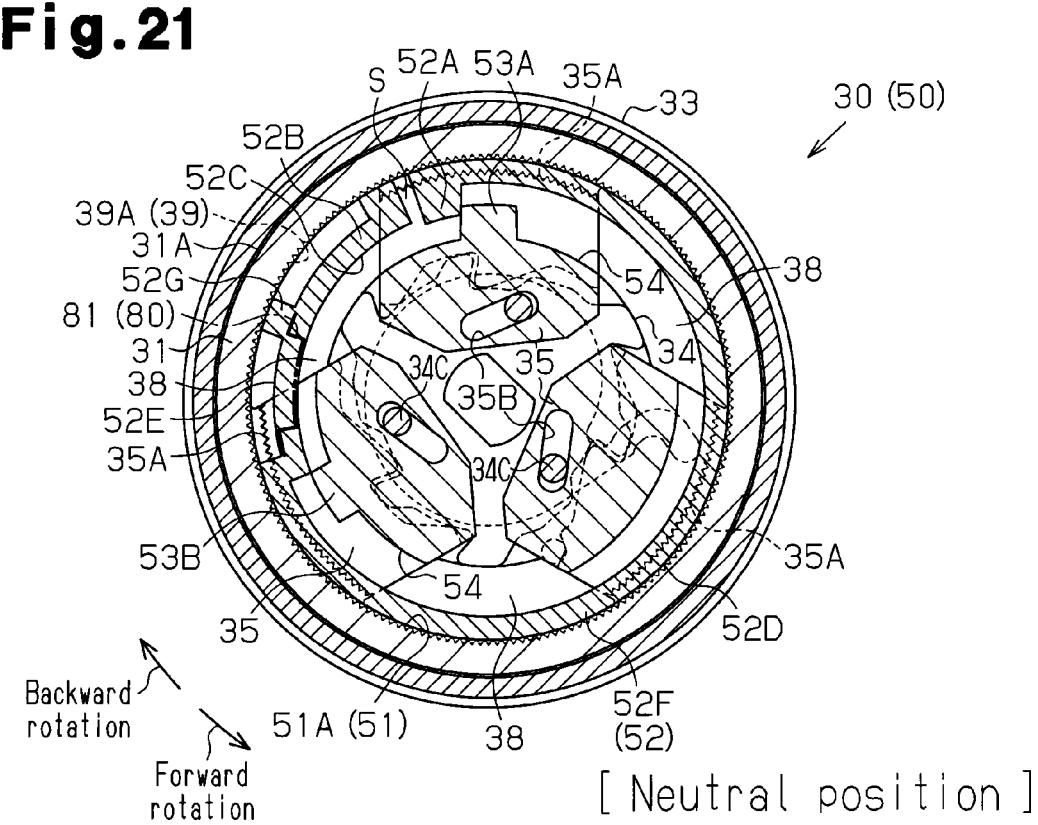
FIG. 21 is a cross-sectional view illustrating the seat reclining device that has unlocked the seat back so that it can be tilted with an angular position being remembered.

The second operation lever 62 is pulled up until it abuts on the upper stopper 67A. Thereupon, the engagement portion 53B of the pawl 35 disengages from the engagement receiving portion 52B as shown in FIG. 21 and rides over the engagement receiving portion 52B. This allows the pawls 35 to rotate clockwise in FIG. 21 relative to the memory plate 52. Namely, the first member 31 is allowed to rotate counterclockwise in FIG. 21 relative to the memory plate 52. Accordingly, the seat back can be tilted forward. At this time, the engagement portion 53A of the pawl 35 is still engaged with the engagement receiving portion 52A and cannot ride over the engagement receiving portion 52B. Therefore, pulling up the second operation lever 62 does not allow the pawls 35 to rotate counterclockwise in FIG. 21 relative to the memory plate 52. Namely, the first member 31 is not allowed to rotate clockwise in FIG. 21 relative to the memory plate 52. Accordingly, the seat back cannot be tilted backward. When tilting the seat back backward, therefore, it can be locked at any angle without the angular position of the seat back being remembered.

Figure 22:
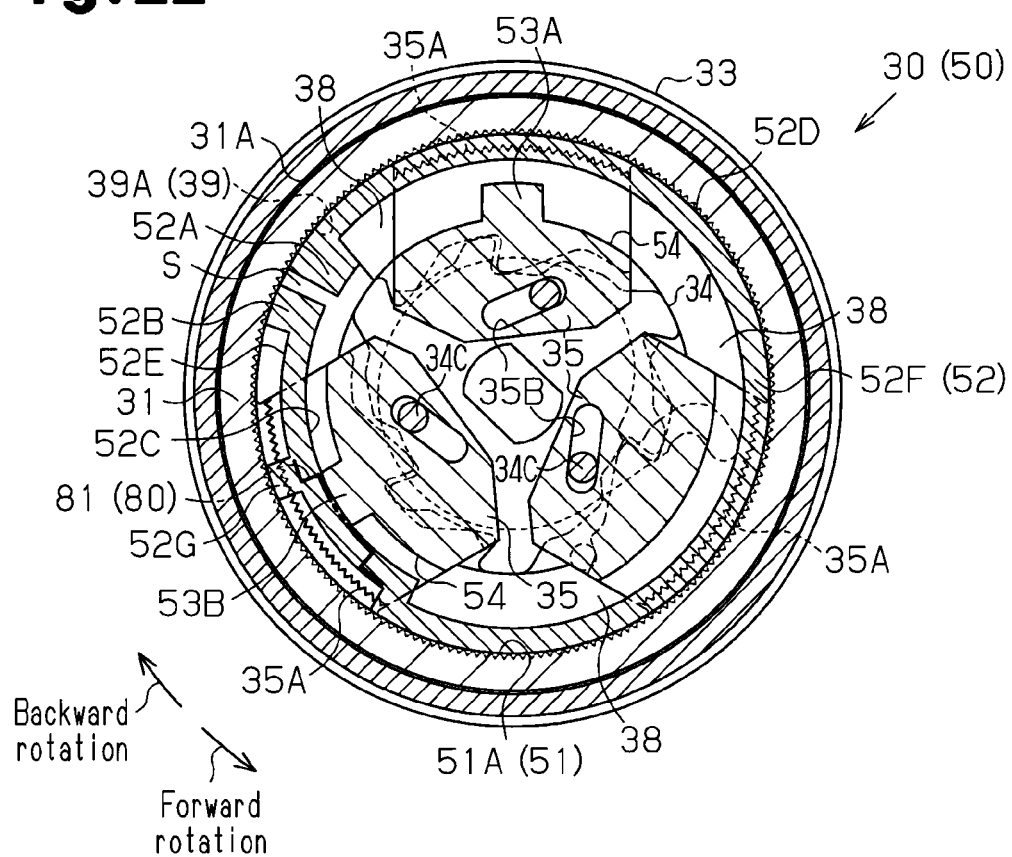
FIG. 22 is a cross-sectional view illustrating the seat reclining device when the seat back is tilted forward.

Since the engagement portion 53B has ridden over the engagement receiving portion 52B, it does not press the engagement receiving portion 52B circumferentially. Since the memory plate 52 is not pressed by the engagement portion 53B, the memory plate 52 is not reduced in diameter. The friction between the outer circumferential surface 52D of the memory plate 52 and the inner circumferential surface 51A of the housing recess 51 is therefore not reduced, and the sliding resistance therebetween is not reduced. Accordingly, when the seat back is tilted forward, the engagement portion 53B slides on the inner circumferential surface 52C of the engagement receiving portion 52B, with the memory plate 52 retained by the housing recess 51, as shown in FIG. 22.

The inner circumferential surface 81A of the rotation restricting portion 81 has the same diameter as that of the inner circumferential surface 52C of the engagement receiving portion 52B. The engagement portion 53B can therefore slide on the inner circumferential surface 81A of the rotation restricting portion 81 indicated by the lines in which a long dash alternates with a pair of short dashes in FIG. 22. The rotation restricting portion 81 does not inhibit the sliding of the engagement portion 53B on the inner circumferential surface 52C of the engagement receiving portion 52B. Accordingly, the seat back can be tilted from the seating region into the forward folding region. Since the memory plate 52 does not rotate relative to the first member 31, both engagement receiving portions 52A and 52B are held at the position in the locked state immediately before the unlocking. In this way, the angular position of the seat back where it is locked immediately before being unlocked is remembered.

The restriction of the sliding movement of the seat cushion is canceled in coordination with the forward tilting of the seat back. The seat cushion can therefore be slid forward relative to the vehicle floor. When the seat back that has been tilted forward is pulled back, the engagement portion 53B slides on the inner circumferential surface 52C of the engagement receiving portion 52B in an opposite direction from that when the seat back is tilted forward, with the memory plate 52 retained by the housing recess 51. At this time, both engagement receiving portions 52A and 52B are held at the position in the locked state immediately before the unlocking.

When the seat back has come to the remembered angular position, and when the engagement portion 53B has passed the engagement receiving portion 52B, the cam 34 is rotated counterclockwise in FIG. 21 relative to the first member 31 by the urging force of the spiral spring 36. As the cam 34 rotates, the cam surface 34B presses the pawl cam surfaces 35C, so that the pawls 35 each move radially outward in the guide grooves. The external teeth 35A of the pawls 35 thereby mesh with the internal gear 39A of the first member 31 as shown in FIG. 10, thus restricting the first member 31 from rotating relative to the second member 32. The seat back is therefore locked at the neutral position, which is the angular position immediately before it is tilted forward.

As shown in FIG. 8, the housing recess 51 is adjacent to the meshing part of the internal gear 39A and the external teeth 35A on the opposite side from the second member 32. The memory plate 52 is housed in the housing recess 51 to be slidable in the circumferential direction. The pawls 35 are arranged between the memory plate 52 and the second member 32. The pawls 35 each have external teeth 35A facing the internal gear 39A. The external teeth 35A of the pawls 35 mesh with the internal gear 39A, or disengage therefrom, as the pawls 35 each move in the radial direction. To allow easy movement of the pawls 35, there are gaps around the pawls 35.

Figure 9:
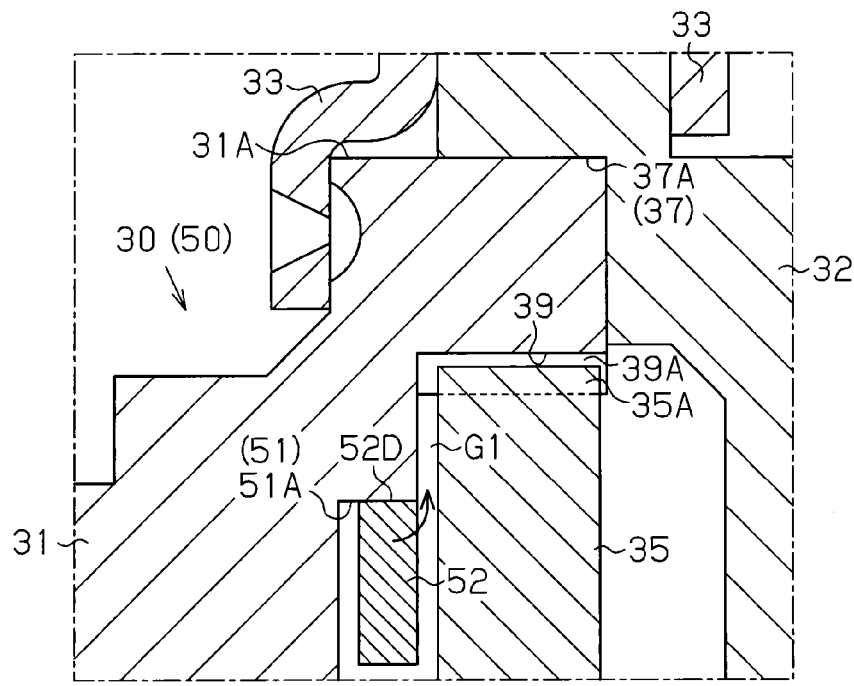
FIG. 9 is a partial cross-sectional view illustrating a comparative example of a seat reclining device.

If, for example, the inner circumferential surface 51A of the housing recess 51 had a smaller diameter than the diameter of the addendum circle of the internal gear 39A as shown in FIG. 9, there would be a gap G1 between the housing recess 51 and the pawls 35. The memory plate 52, in the meantime, as it is housed in the housing recess 51 while being reduced in diameter, is trying to expand by its own resilient restoring force. In the event that the memory plate 52 comes off of the housing recess 51 by its restoring force, it can easily move into the gap G1 as indicated by the arrow in FIG. 9, which may adversely affect the operation of the locking mechanism 30 or the memory mechanism 50. In this respect, in the first embodiment, the inner circumferential surface 51A of the housing recess 51 has the same diameter as the diameter of the addendum circle of the internal gear 39A, as shown in FIG. 8. The outer circumferential surface 52D of the memory plate 52 is supported by the inner circumferential surface 51A of the housing recess 51. In this case, since there is hardly any gap such as the one G1 described above, even if the memory plate 52 tilts and comes off of the housing recess 51 by its own restoring force, it can hardly go into such a gap G1. Therefore, the operation of the locking mechanism 30 or the memory mechanism 50 is not adversely affected.

The first embodiment described in detail above provides the following advantages.

(1) The memory mechanism 50 includes the following constituent elements as shown in FIG. 20:

the engagement portions 53A and 53B respectively provided to an adjacent pair of pawls 35;

the cylindrical housing recess 51 provided in the first member 31;

the memory plate 52 having an annular shape and cut at one point, the memory plate 52 being housed in the housing recess 51 while being reduced in diameter, with the cut portion S arranged between the engagement portions 53A and 53B; and the pair of engagement receiving portions 52A and 52B provided to the memory plate 52 and arranged between the engagement portions 53A and 53B, which engagement receiving portions 52A and 52B the engagement portions 53A and 53B engage with and disengage from as the pawls 35 move.

With this configuration, the surface pressure between the outer circumferential surface 52D of the memory plate 52 and the inner circumferential surface 51A of the housing recess 51, i.e., the friction between the memory plate 52 and the housing recess 51, does not need to be reduced in order to unlock and allow the seat back to tilt without an angular position being remembered. The seat back can therefore be adjusted to a desired angular position with an appropriate operation load. The memory plate 52 can also be stopped from rotating with the pawls 35, in the unlocked state in which the seat back is allowed to tilt with an angular position being remembered.

(2) The housing recess 51 is adjacent to the meshing part of the internal gear 39A and the external teeth 35A on the opposite side from the second member 32. The inner circumferential surface 51A of the housing recess 51 has the same diameter as the diameter of the addendum circle of the internal gear 39A. The outer circumferential surface 52D of the memory plate 52 is supported by the inner circumferential surface 51A of the housing recess 51. With this configuration, the gap G1 present around the pawls 35 can be minimized. Accordingly, even if the memory plate 52 comes off of the housing recess 51 by its own restoring force, it can hardly go into such a gap G1. Therefore, the operation of the locking mechanism 30 or the memory mechanism 50 is not adversely affected.

(3) The thickness t1 of the memory plate 52 is made the same both in the portion 52F between the engagement receiving portions 52A and 52B of the memory plate 52 and in the engagement receiving portion 52B on which the engagement portion 53B slides. In this case, unlike a memory plate 52 having the same outer diameter all around, the memory plate 52 is not distorted when flexed and assembled into the housing recess 51. Therefore the memory plate 52 can be readily fitted into the housing recess 51. The memory plate 52 is not distorted either, when pressure is applied from the engagement portion 53B to the engagement receiving portion 52B to reduce the cut portion S of the memory plate 52 and to rotate the memory plate 52 with the pawls 35 relative to the housing recess 51. As a result, the friction between the outer circumferential surface 52D of the memory plate 52 and the inner circumferential surface 51A of the housing recess 51 can be reduced.

(4) The switch limit mechanism 80 limits the switching between the locked and unlocked states by the locking mechanism 30 performed by operating the first operation lever 61 such that the seat back is locked or unlocked only when it is tilted within the seating region. Therefore, when the first operation lever 61 is inadvertently operated so that the seat back is tilted in the forward folding region, the restriction of the sliding movement of the seat cushion is prevented from being canceled.

(5) The switch limit mechanism 80 includes a rotation restricting portion 81 provided to the first member 31. The inner circumferential surface 81A of the rotation restricting portion 81 has the same diameter as that of the inner circumferential surface 52C of the engagement receiving portion 52B. When the first operation lever 61 is operated, the engagement portion 53B half engaged with the engagement receiving portion 52B is abutted on the rotation restricting portion 81, so that the memory plate 52 and the pawls 35 are stopped from rotating, to prevent the seat back from tilting from the seating region into the forward folding region. When the second operation lever 62 is operated, the engagement portion 53B rides over the engagement receiving portion 52B and the rotation restricting portion 81 and slides on the inner circumferential surface 52C of the engagement receiving portion 52B. Accordingly, the seat back can be tilted from the seating region into the forward folding region.

(6) In Patent Document 1, a seat reclining device having both a locking mechanism and a memory mechanism is arranged on one side of the vehicle seat, and a seat reclining device having only a locking mechanism is arranged on the other side of the vehicle seat. A lost motion mechanism is provided between the operation shafts of both seat reclining devices. However, with this configuration, it is difficult to make the locking mechanisms work in synchronism between the seat reclining devices. In this respect, in the first embodiment, seat reclining devices 20A and 20B having both the locking mechanism 30 and the memory mechanism 50 are provided on both sides of the vehicle seat device. The operation shafts 16A and 16B of both seat reclining devices 20A and 20B are connected to each other via the rod 22. Therefore, by rotating the operation shafts 16A and 16B together, the locking mechanisms 30 of both seat reclining devices 20A and 20B can be made to work in synchronism. Thus the memory mechanisms 50 of both seat reclining devices 20A and 20B can be made to work in synchronism.

(7) The second operation lever 62 is operated at least for unlocking and allowing the seat back to tilt with an angular position being remembered. In this case, with the lost motion mechanism 75, the movement of the second operation lever 62 is not transmitted to the first operation lever 61, and the first operation lever 61 is put in a non-operational state. The unlocking operation to allow the seat back to tilt without an angular position being remembered, by operating the first operation lever 61 or the second operation lever 62, is therefore not affected.

(8) The first operation lever 61 is supported to be rotational relative to the operation shaft 16B. The second operation lever 62 is connected to the link member 65 that rotates with the operation shaft 16A via the cable 68. The lost motion mechanism 75 includes the cable 68, the link member 76, the oblong hole 77, and the pin 78. The pin 78 is allowed to move inside the oblong hole 77 when at least the second operation lever 62 is operated for unlocking and allowing the seat back to tilt, with its angular position being remembered. Therefore, the movement of the second operation lever 62 is not transmitted to the first operation lever 61, and the first operation lever 61 is put in a non-operational state. The difference in the amount of rotation of the operation shafts 16A and 16B between the two different unlocked states, can thus be absorbed.

(Second Embodiment)

Next, a second embodiment of the present invention will be described with reference to FIGS. 23 and 24. Parts and elements of the second embodiment that are the same as those of the first embodiment will be given the same reference numerals and will not be described in detail.

The second embodiment is different from the first embodiment in that the switch limit mechanism 80 is provided outside the seat reclining devices 20A and 20B. The (left side) seat reclining device 20A is intended as the embodiment, with the operation shaft 16A, to which the second operation lever 62 is connected via the cable 68 and the link member 65. The switch limit mechanism 80 includes an abutment receiving portion 91, a movable stopper 92, the link member 65, and rotation transmission control means 95. The abutment receiving portion 91 is secured to the side frame 15A on the left side. The abutment receiving portion 91 moves around the operation shaft 16A as the seat back tilts.

The movable stopper 92 is supported by a shaft 93 in front of the operation shaft 16A on the left-side support bracket 14D. The movable stopper 92 is abutted on the abutment receiving portion 91 to restrict the tilting of the seat back (abutting position shown in FIG. 23). The movable stopper 92 is rotated between the abutting position and a non-abutting position (see FIG. 24) closer to the operation shaft 16A. The link member 65 transmits the rotation of the operation shafts 16A and 16B to the movable stopper 92 as the second operation lever 62 is operated. The rotation transmission control means 95 is made up of a cam hole 96 formed in the movable stopper 92 and a pin 97. The pin 97 is received in the cam hole 96 and secured to the link member 65. The pin 97 moves around the operation shaft 16A as the link member 65 rotates.

The shape of the cam hole 96 satisfies the following conditions:

Condition 1: The rotating movement of the link member 65 is not transmitted to the movable stopper 92 when the first operation lever 61 or the second operation lever 62 is operated in order to rotate the operation shafts 16A and 16B within the rotating operating range a by an angle for unlocking the seat back so that it can be tilted without its angular position being remembered;

Condition 2: The rotating movement of the link member 65 is transmitted to the movable stopper 92 when the second operation lever 62 is operated in order to rotate the operation shafts 16A and 16B more largely than for unlocking the seat back so that it can be tilted without its angular position being remembered;

When Condition 1 is satisfied, the movable stopper 92 comes to the abutting position and the forward tilting of the seat back is restricted. Accordingly, the switching between the locked and unlocked states is limited to be performed only when the seat back is tilted within the seating region.

When Condition 2 is satisfied, the movable stopper 92 retracts to the non-abutting position and the restriction of the forward tilting of the seat back is canceled. Accordingly, the seat back can be tilted from the seating region into the forward folding region.

Figure 23:
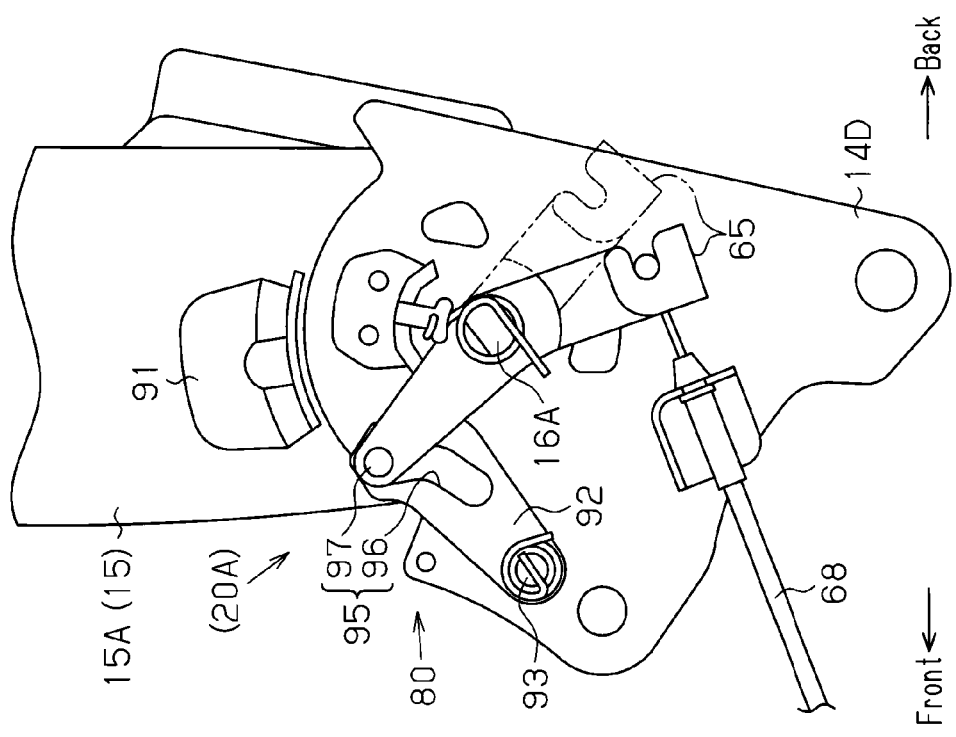
FIG. 23 is a partial side view illustrating a switch limit mechanism according to a second embodiment of the present invention.

In the second embodiment, in Condition 1, the link member 65 rotates with the operation shaft 16A, as shown in FIG. 23. Concurrently, the pin 97 moves within the cam hole 96 around the operation shaft 16A, as indicated by the broken line in which a long dash alternates with a pair of short dashes in FIG. 23. This rotating movement of the link member 65 is not transmitted to the movable stopper 92 via the pin 97 and the cam hole 96. Namely, the movable stopper 92 abuts on the abutment receiving portion 91, to restrict the forward tilting of the abutment receiving portion 91, i.e., of the seat back. By this restriction, the switching between the locked and unlocked states by the first operation lever 61 is limited to be performed only when the seat back is tilted within the seating region.

Figure 24:
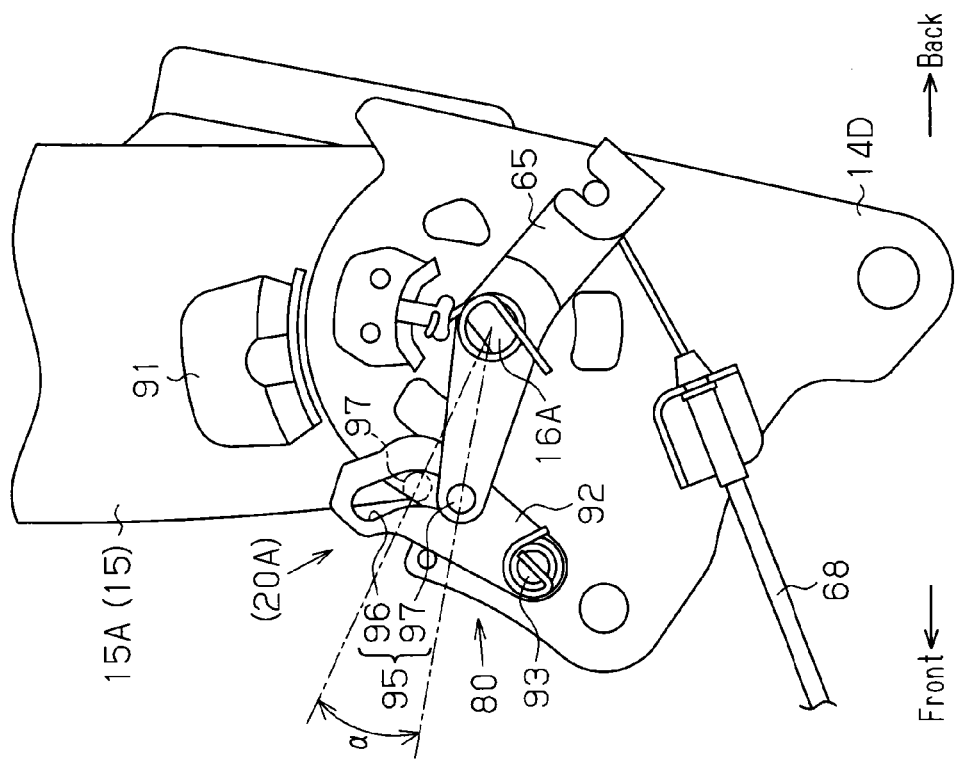
FIG. 24 is a partial side view illustrating the switch limit mechanism when the second operation lever is operated.

In Condition 2, the link member 65 rotates with the operation shafts 16A and 16B more largely than when the first operation lever 61 is operated, as indicated by the solid lines in FIG. 24. This rotating movement of the link member 65 is transmitted to the movable stopper 92 via the pin 97 and the cam hole 96. Thereupon, the movable stopper 92 retracts to the non-abutting position shown in FIG. 24. This cancels the restriction of the forward tilting of the seat back, so that the seat back can be tilted from the seating region into the forward folding region by operating the second operation lever 62.

The second embodiment thus provides the following advantages.

(9) The switch limit mechanism 80 includes an abutment receiving portion 91, a movable stopper 92, the link member 65, and rotation transmission control means 95, outside the seat reclining devices 20A and 20B. With this configuration, the advantage described in (4) can be achieved.

(10) The rotation transmission control means 95 includes a cam hole 96 formed in the movable stopper 92, and a pin 97 provided to the link member 65 and received in the cam hole 96. With this configuration, the rotation transmission control means 95 can be formed with a simple configuration.

As alternative embodiments, the following changes may be made to either of the embodiments described above.

At least one of the engagement receiving portions 52A and 52B may be provided to a different position from the ends of the memory plate 52, as long as they are located between the engagement portions 53A and 53B and adjacent to the engagement portion 53A or 53B.

The engagement receiving portions 52A and 52B may be formed as recesses on the inner circumferential side of the memory plate 52.

The cam 34 may have a different number of cam profile portions 34A and pawls 35. The cam profile portions 34A of the cam 34 and the cam holes 35B of the pawls 35 may have different shapes.

The oblong hole 77 may be formed in the first operation lever 61, and the pin 78 may be provided to the link member 76.

In the first embodiment, the operation shafts 16A and 16B may be one common rod.

In the second embodiment, the cam hole 96 may be formed in the link member 65, and the pin 97 may be provided to the movable stopper 92.

In either of the embodiments, the first member 31 may be attached to the support brackets 14D and 14E, and the second member 32 may be attached to the side frames 15A and 15B.

The radial dimension of the engagement receiving portion 52A may be set such that the engagement portion 53A can ride over it, as with the engagement receiving portion 52B. In this case, the angular position of the seat back can be remembered not only when it is tilted forward but when it is tilted backward.

Figure 25:
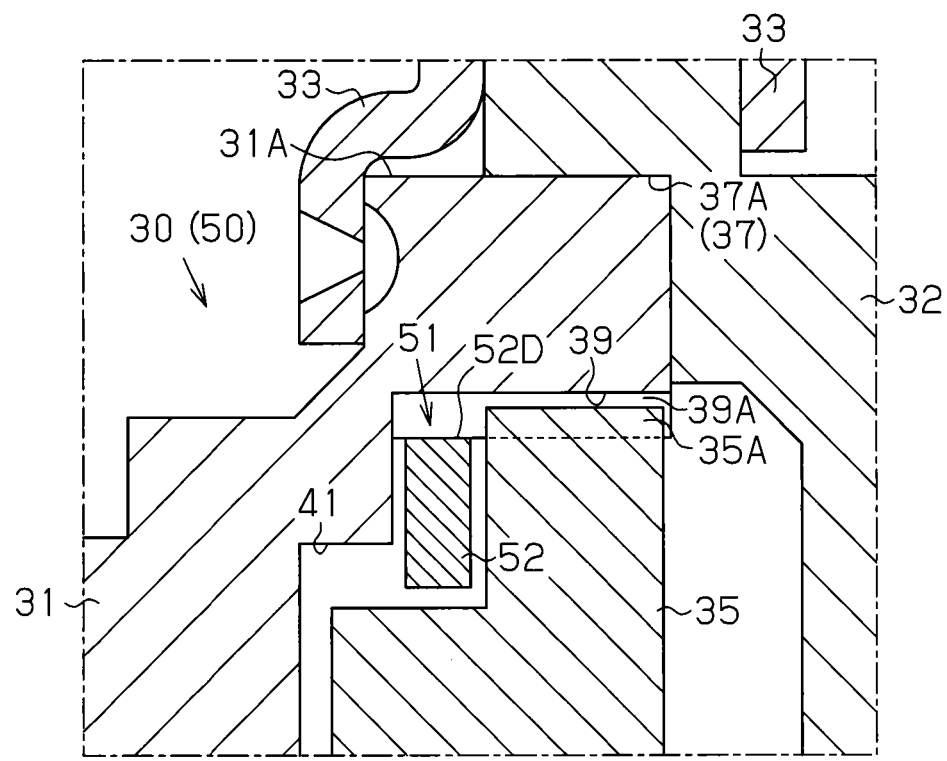
FIG. 25 is a partial cross-sectional view illustrating another example of a housing recess.
Figure 26:
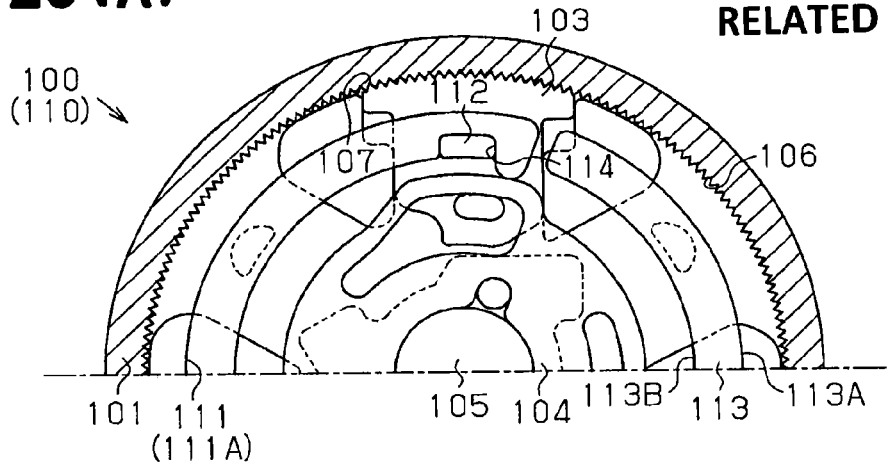
FIG. 26(A) is a partial cross-sectional view illustrating a conventional seat reclining device.
FIG. 26(B) is a partial cross-sectional view illustrating the conventional seat reclining device.
FIG. 26(C) is a partial cross-sectional view illustrating the conventional seat reclining device.
Figure 26:
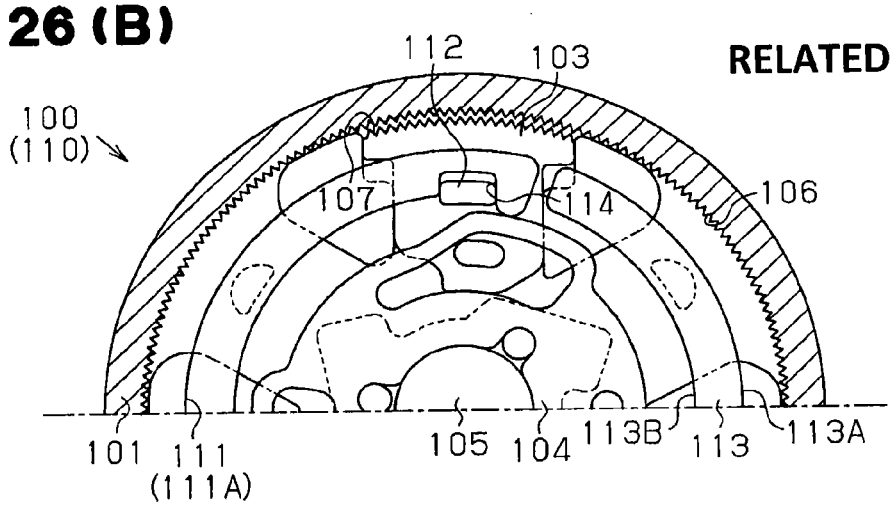
Figure 26:
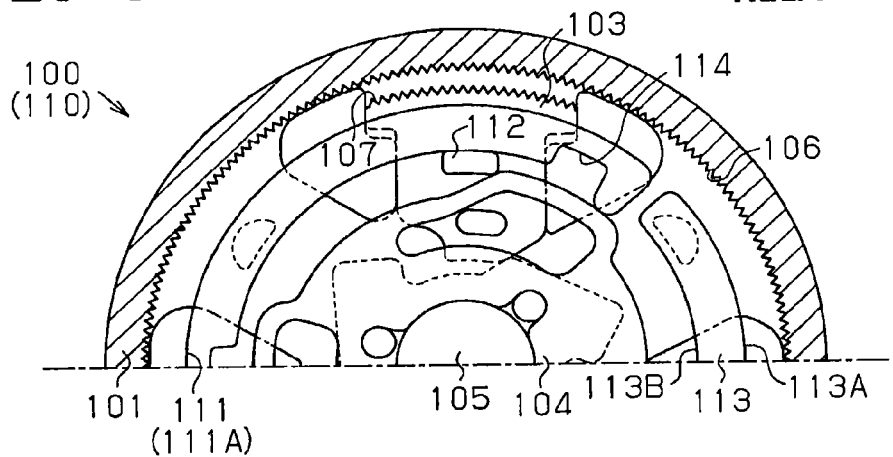

As shown in FIG. 25, an inside space of the internal gear 39A on the opposite side of the meshing part of the internal gear 39A and the external teeth 35A from the second member 32 may be used as the housing recess 51. In this case, the outer circumferential surface 52D of the memory plate 52 is supported by the tooth tops of the internal gear 39A inside the housing recess 51. In this case, too, the gap G1 present around the pawls 35 can be minimized as much as possible. Accordingly, even if the memory plate 52 comes off of the housing recess 51 by its own restoring force, it can hardly go into the gap G1. Therefore, the operation of the locking mechanism 30 or the memory mechanism 50 is not adversely affected.

The configuration of the lost motion mechanism 75 may be changed, on condition that the movement of the second operation lever 62 is not transmitted to the first operation lever 61 when the second operation lever 62 is operated for unlocking the seat back so that it can be tilted with an angular position being remembered.

The present invention may be applied to the seat device of other conveyances such as airplanes, ships, and trains, other than the vehicle seat device.

The invention claimed is:

1. A seat reclining device comprising a locking mechanism and a memory mechanism, wherein
the locking mechanism switches a seat back between a locked state, in which the seat back is restricted from tilting relative to a seat cushion, and an unlocked state, in which the seat back is allowed to tilt, in accordance with a rotating movement of an operation shaft,
the memory mechanism stores an angular position of the seat back where it is located immediately before being unlocked,
the seat back, once unlocked, is locked only when it is tilted to the angular position that has been remembered,
the locking mechanism includes a first member, a second member, and a plurality of locking members,
the first member is attached to one of the seat cushion and the seat back and has an internal gear around the operation shaft,
the second member is attached to the other one of the seat cushion and the seat back and rotational around the operation shaft relative to the first member,
the locking members are each attached to the second member and have external teeth facing the internal gear,
the seat back is locked when the locking members are each pressed radially outward so that the external teeth mesh with the internal gear,
the seat back is unlocked when the operation shaft is rotated thereby to move each of the locking members radially inward so that the external teeth disengage from the internal gear,
the memory mechanism includes an engagement portion, a housing recess, a memory plate, and a pair of engagement receiving portions,
the engagement portion is provided to an adjacent pair of the plurality of locking members,
the housing recess is formed in a cylindrical shape in the first member,
the memory plate is formed in an annular shape that is cut at one point,
the memory plate is housed in the housing recess while being reduced in diameter with the cut portion being located between the engagement portions,
each of the pair of engagement receiving portions is provided to the memory plate and adjacent to and between the engagement portions,
the engagement portions engage with and disengage from the engagement receiving portions as the locking members move in the radial direction, and
the unlocked state includes:
an unlocked state in which the engagement receiving portions are pressed circumferentially with the engagement portions half engaged with the engagement receiving portions and the memory plate rotates together with the locking members relative to the housing recess, so that the seat back is allowed to tilt without the angular position being remembered; and
an unlocked state in which the engagement portion rides over the engagement receiving portion and slides on an inner circumferential surface of the engagement receiving portion with the memory plate being made irrotational relative to the housing recess, so that the seat back is allowed to tilt with the angular position being stored,
in the unlocked state in which the seat back is allowed to tilt without remembering the angular position,
when the seat back is tilted forward, one of the engagement portions presses its adjacent engagement receiving portion circumferentially so that a space of the cut portion of the memory plate is reduced with the engagement portions half engaged with the engagement receiving portions, and
when the seat back is tilted backward, the other of the engagement portions presses its adjacent engagement receiving portion circumferentially so that the space of the cut portion of the memory plate is reduced with the engagement portions half engaged with the engagement receiving portions.

2. The seat reclining device according to claim 1, wherein the housing recess is adjacent to a meshing part of the internal gear and the external teeth on an opposite side from the second member, and
the housing recess includes an inner circumferential surface and supports an outer circumferential surface of the memory plate with the inner circumferential surface having the same diameter as the diameter of an addendum circle of the internal gear or with tooth tops of the internal gear.

3. The seat reclining device according to claim 1, wherein the engagement receiving portions protrude radially inward from different positions on the memory plate,
the memory plate has a radial thickness set identical in a portion between the engagement receiving portions and in the engagement receiving portion of the memory plate, and
the engagement receiving portion is a portion on which the engagement portion slides in a state in which the seat back is unlocked and allowed to tilt with the angular position being remembered.

4. The seat reclining device according to claim 1, wherein the seat reclining device is applied to a seat device having a first operation lever, a second operation lever, and a seat sliding device,
the first operation lever is operated to rotate the operation shaft to unlock and allow the seat back to tilt without the angular position being remembered,
the second operation lever is operated to rotate the operation shaft to unlock and allow the seat back to tilt without the angular position being remembered, and to rotate the operation shaft more largely than for the unlocking, thereby to unlock and allow the seat back to tilt with the angular position being remembered, the seat back has a tilting range divided into a seating region, in which the inclination angle thereof is adjusted, and a forward folding region set forward of the seating region, the seat back is tilted relative to the seat cushion within the tilting range around the operation shaft, which is rotated by operating the first operation lever or the second operation lever, the seat sliding device restricts sliding movement of the seat cushion at least in the seating region, and cancels the restriction of the sliding movement of the seat cushion in coordination with a tilting movement of the seat back from the seating region into the forward folding region after being unlocked by the locking mechanism upon the second operation lever being operated, the seat reclining device further comprises a switch limit mechanism, and during operation of the first operation lever, the switch limit mechanism allows switching between locking and unlocking of the seat back by the locking mechanism only when the seat back is tilted within the seating region.

5. The seat reclining device according to claim 4, wherein the switch limit mechanism includes a rotation restricting portion provided in the first member, the rotation restricting portion has an inner circumferential surface with the same diameter as that of the inner circumferential surface of the engagement receiving portion, on which the engagement portion slides, when the first operation lever is operated, the engagement portion that is half engaged is abutted on the rotation restricting portion so that the memory plate and the locking members are restricted from rotating, whereby the seat back is stopped from tilting from the seating region into the forward folding region, and when the second operation lever is operated, the engagement portion rides over the engagement receiving portion and the rotation restricting portion and slides on the inner circumferential surface of the engagement receiving portion, whereby the seat back is allowed to tilt from the seating region into the forward folding region.

6. A seat device characterized by the seat reclining device according to claim 1, wherein the seat reclining device is provided on either side of the seat device, and the operation shafts of the respective seat reclining devices are integrally rotational.

7. The seat device according to claim 6, wherein a first operation lever or a second operation lever is operated to rotate the operation shafts to unlock and allow the seat back to tilt without the angular position being remembered, the second operation lever is operated to rotate the operation shafts more largely than when unlocking and allowing the seat back to tilt without the angular position being remembered, whereby the seat back is unlocked and allowed to tilt with the angular position being remembered, the seat device further comprises a lost motion mechanism, and when the second operation lever is operated to unlock and allow the seat back to tilt with the angular position being stored, the lost motion mechanism puts the first operation lever in a non-operational state without transmitting a movement of the second operation lever to the first operation lever.

8. The seat device according to claim 7, wherein the first operation lever is supported to be rotational relative to the operation shafts, the second operation lever is connected to the operation shafts, the lost motion mechanism includes:

a link member connected to the operation shafts;

an oblong hole that is provided to one of the first operation lever and the link member and has an arcuate shape having a center coinciding with the operation shaft; and a pin that is provided to the other one of the first operation lever and the link member and is received in the oblong hole, and when the second operation lever is operated to unlock and allow the seat back to tilt with the angular position being remembered, the pin is allowed to move within the oblong hole so that the movement of the second operation lever is not transmitted to the first operation lever and the first operation lever is put in a non-operational state.

9. A vehicle seat device comprising a seat back, a locking mechanism, a seat sliding device, and a switch limit mechanism, wherein the seat back has a tilting range divided into a seating region, in which an inclination angle thereof is adjusted, and a forward folding region set forward of the seating region, the seat back is tilted within the tilting range around an operation shaft relative to the seat cushion, when a first operation lever or a second operation lever is operated to rotate the operation shaft, the locking mechanism switches the seat back between a locked state, in which the seat back is restricted from tilting relative to the seat cushion, and an unlocked state, in which the seat back is allowed to tilt, the seat cushion is restricted from sliding at least in the seating region, the restriction of the sliding movement of the seat cushion is canceled in coordination with a tilting movement of the seat back from the seating region into the forward folding region after being unlocked by the locking mechanism, upon the second operation lever being operated, during operation of the first operation lever, the switch limit mechanism allows switching between locking and unlocking of the seat back by the locking mechanism only when the seat back is tilted within the seating region, the locking mechanism includes a first member, a second member, and a plurality of locking members, the first member is attached to one of the seat cushion and the seat back and has an internal gear around the operation shaft, the second member is attached to the other one of the seat cushion and the seat back and rotational around the operation shaft relative to the first member, the locking members are each attached to the second member and have external teeth facing the internal gear, the seat back is locked when the locking members are each pressed radially outward so that the external teeth mesh with the internal gear, the seat back is unlocked when the operation shaft is rotated thereby to move each of the locking members radially inward so that the external teeth disengage from the internal gear, the vehicle seat device further comprises a memory mechanism that remembers an angular position of the seat back where it is located immediately before being unlocked, the seat back, once unlocked, is locked only when it is tilted to the angular position that has been remembered, the memory mechanism works when the second operation lever is operated to rotate the operation shaft, the memory mechanism includes a housing recess, a memory plate, and an engagement portion, the housing recess is formed in a cylindrical shape in the first member, the memory plate is formed in an annular shape that is cut at one point, the memory plate is housed in the housing recess while being reduced in diameter, the memory plate includes a pair of engagement receiving portions at different positions, the engagement portion is provided to each of a pair of locking members, and engages with and disengages from the engagement receiving portions as the locking members move in the radial direction, and the unlocked state includes:

an unlocked state in which the engagement receiving portions are pressed circumferentially with the engagement portions half engaged with the engagement receiving portions and the memory plate rotates together with the locking members relative to the housing recess, so that the seat back is allowed to tilt without the angular position being remembered; and an unlocked state in which the engagement portion going over the engagement receiving portion and slides on an inner circumferential surface of the memory plate with the memory plate being made irrotational relative to the housing recess, so that the seat back is allowed to tilt with the angular position being stored, the switch limit mechanism includes a rotation restricting portion provided in the first member, the rotation restricting portion has an inner circumferential surface with the same diameter as that of the inner circumferential surface of the memory plate on which the engagement portion slides, when the first operation lever is operated, the engagement portion that is half engaged is abutted on the rotation restricting portion so that the memory plate and the locking members are restricted from rotating, whereby the seat back is stopped from tilting from the seating region into the forward folding region, and when the second operation lever is operated, the engagement portion rides over the engagement receiving portion and the rotation restricting portion and slides on the inner circumferential surface of the memory plate, whereby the seat back is allowed to tilt from the seating region into the forward folding region.

10. A vehicle seat device comprising a seat back, a locking mechanism, a seat sliding device, and a switch limit mechanism, wherein the seat back has a tilting range divided into a seating region, in which an inclination angle thereof is adjusted, and a forward folding region set forward of the seating region, the seat back is tilted within the tilting range around an operation shaft relative to the seat cushion, when a first operation lever or a second operation lever is operated to rotate the operation shaft, the locking mechanism switches the seat back between a locked state, in which the seat back is restricted from tilting relative to the seat cushion, and an unlocked state, in which the seat back is allowed to tilt, the seat cushion is restricted from sliding at least in the seating region, the restriction of the sliding movement of the seat cushion is canceled in coordination with a tilting movement of the seat back from the seating region into the forward folding region after being unlocked by the locking mechanism, upon the second operation lever being operated, during operation of the first operation lever, the switch limit mechanism allows switching between locking and unlocking of the seat back by the locking mechanism only when the seat back is tilted within the seating region, the locking mechanism includes a first member, a second member, and a plurality of locking members, the first member is attached to one of the seat cushion and the seat back and has an internal gear around the operation shaft, the second member is attached to the other one of the seat cushion and the seat back and rotational around the operation shaft relative to the first member, the locking members are each attached to the second member and have external teeth facing the internal gear, the seat back is locked when the locking members are each pressed radially outward so that the external teeth mesh with the internal gear, the seat back is unlocked when the operation shaft is rotated thereby to move each of the locking members radially inward so that the external teeth disengage from the internal gear, the vehicle seat device further comprises a memory mechanism that remembers an angular position of the seat back where it is located immediately before being unlocked, the seat back, once unlocked, is locked only when it is tilted to the angular position that has been remembered, the memory mechanism works when the second operation lever is operated to rotate the operation shaft, the memory mechanism includes a housing recess, a memory plate, and an engagement portion, the housing recess is formed in a cylindrical shape in the first member, the memory plate is formed in an annular shape that is cut at one point, the memory plate is housed in the housing recess while being reduced in diameter, the memory plate includes a pair of engagement receiving portions at different positions, the engagement portion is provided to each of a pair of locking members, and engages with and disengages from the engagement receiving portions as the locking members move in the radial direction, and the unlocked state includes:

an unlocked state in which the engagement receiving portions are pressed circumferentially with the engagement portions half engaged with the engagement receiving portions and the memory plate rotates together with the locking members relative to the housing recess, so that the seat back is allowed to tilt without the angular position being remembered; and an unlocked state in which the engagement portion going over the engagement receiving portion and slides on an inner circumferential surface of the memory plate with the memory plate being made irrotational relative to the housing recess, so that the seat back is allowed to tilt with the angular position being stored, the switch limit mechanism includes:

an abutment receiving portion that is provided to the seat back and is displaced with a tilting movement of the seat back;

a movable stopper tiltably supported by a shaft to tilt between an abutting position, where the movable stopper is abutted on the abutment receiving portion to restrict tilting of the seat back, and a non-abutting position, where the movable stopper is retracted from the abutting position;

a link member that is connected to the operation shaft and capable of transmitting, to the movable stopper, rotation of the operation shaft upon the first operation lever or the second operation lever being operated; and rotation transmission control means, wherein the rotation transmission control means does not transmit rotating movement of the link member to the movable stopper when the first operation lever or the second operation lever is operated in order to rotate the operation shaft by an angle for unlocking and allowing the seat back to tilt without an angular position being remembered;

positions the movable stopper at the abutting position to restrict the seat back from being tilted forward, whereby switching between the locked and unlocked states by the locking mechanism is allowed to be performed only when the seat back is tilted within the seating region;

transmits rotating movement of the link member to the movable stopper when the second operation lever is operated more largely to rotate the operation shaft than when unlocking and allowing the seat back to tilt without an angular position being remembered; and retracts the movable stopper to the non-abutting position to cancel the restriction of the forward tilting of the seat back, whereby the seat back is allowed to tilt from the seating region into the forward folding region.

11. The vehicle seat device according to claim 10, wherein the rotation transmission control means includes a cam hole formed in one of the movable stopper and the link member, and a pin provided to the other one of the movable stopper and the link member and received in the cam hole.

* * * * *